US012574150B2

(12) United States Patent (10) Patent No.: US 12,574,150 B2
Yoshioka et al. (45) Date of Patent: Mar. 10, 2026

(54) TERMINAL AND COMMUNICATION METHOD

(71) Applicant: NTT DOCOMO, INC., Tokyo (JP)

(72) Inventors: Shohei Yoshioka, Tokyo (JP); Shinya Kumagai, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 439 days.

(21) Appl. No.: 18/044,246

(22) PCT Filed: Oct. 9, 2020

(86) PCT No.: PCT/JP2020/038391
§ 371 (c)(1),
(2) Date: Mar. 7, 2023

(87) PCT Pub. No.: WO2022/074849
PCT Pub. Date: Apr. 14, 2022

(65) Prior Publication Data
US 2023/0370198 A1     Nov. 16, 2023

(51) Int. Cl.
*H04L 1/08* (2006.01)
*H04W 72/21* (2023.01)
*H04W 72/566* (2023.01)

(52) U.S. Cl.
CPC ............... *H04L 1/08* (2013.01); *H04W 72/21* (2023.01); *H04W 72/566* (2023.01)

(58) Field of Classification Search
CPC ....... H04L 1/08; H04L 1/1896; H04L 1/1854; H04L 1/1861; H04W 72/21; H04W 72/566; H04W 72/40; H04W 4/46
See application file for complete search history.

(56) References Cited

U.S. PATENT DOCUMENTS

| | | | |
|---|---|---|---|
| 2021/0006318 A1* | 1/2021 | Kim | H04L 1/1812 |
| 2021/0050950 A1* | 2/2021 | Zhou | H04L 1/1812 |
| 2021/0050953 A1* | 2/2021 | Park | H04L 1/1671 |
| 2022/0109527 A1* | 4/2022 | Hwang | H04L 1/1864 |
| 2022/0393805 A1* | 12/2022 | Guo | H04L 1/1854 |

OTHER PUBLICATIONS

Office Action issued in Japanese Patent Application No. 2022-555252, dated Sep. 3, 2024 (6 pages).
(Continued)

*Primary Examiner* — Steven Hieu D Nguyen
(74) *Attorney, Agent, or Firm* — Osha Bergman Watanabe & Burton LLP

(57) ABSTRACT
A terminal includes a receiving unit configured to receive, from a base station, one or more pieces of information specifying a plurality of codebooks for transmitting a response related to retransmission control to be applied to transmission and reception in a downlink; a controlling unit configured to determine which codebook among the plurality of codebooks is a codebook for transmitting a response related to retransmission control to be applied to transmission and reception in a sidelink; and a transmitting unit configured to transmit to the base station, by using the determined codebook, one or more responses related to retransmission control to be applied to transmission and reception in the sidelink.

8 Claims, 11 Drawing Sheets

(56) References Cited

OTHER PUBLICATIONS

International Search Report issued in PCT/JP2020/038391 on Apr. 27, 2021 (5 pages).
Written Opinion of the International Searching Authority issued in PCT/JP2020/038391 on Apr. 27, 2021 (4 pages).
3GPP TS 38.211 V16.2.0; "3rd Generation Partnership Project; Technical Specification Group Radio Access Network; NR; Physical channels and modulation (Release 16)" Jun. 2020 (131 pages).
3GPP TR 22.886 V15.1.0; "3rd Generation Partnership Project; Technical Specification Group Services and System Aspects; Study on enhancement of 3GPP Support for 5G V2X Services (Release 15)" Mar. 2017 (58 pages).
Sharp; "Remaining issues on resource allocation mode 1 for NR sidelink"; 3GPP TSG RAN WG1 Meeting #102-e, R1-2006558; e-Meeting; Aug. 17-28, 2020 (6 pages).
NTT Docomo, Inc.; "Discussion on NR Rel-16 UE features"; 3GPP TSG RAN WG1 #102e, R1-2006703; e-Meeting; Aug. 17-28, 2020 (7 pages).
CMCC; "Discussion on mode-1 resource allocation for NR sidelink"; 3GPP TSG RAN WG1 #98bis, R1-1910163; Chongqing, China; Oct. 14-20, 2019 (4 pages).
Office Action issued in Chinese Patent Application No. 202080105776.3, mailed on Jul. 2, 2024 (16 pages).
Office Action issued in Chinese Patent Application No. 202080105776.3, dated May 13, 2025 (26 pages).
3GPP TSG RAN WG1 Meeting #101-e; R1-200xxxx; Moderator (Huawei); Feature lead summary#1 on 101-e-NR-unlic-NRU-HARQ-03 (NNK1 value); e-Meeting, May 25-Jun. 5, 2020 (42 pages).
3GPP TSG-RAN WG2 #111-e; R2-2008150; Huawei, HiSilicon; "Correction on HARQ ACK spatial bundling configurations for secondary PUCCH group"; Online meeting, Aug. 17-28, 2020 (8 pages).

* cited by examiner

FIG.12

TERMINAL AND COMMUNICATION METHOD

TECHNICAL FIELD

The present invention relates to a terminal and a communication method in a wireless communication system.

BACKGROUND

In LTE (Long Term Evolution) and LTE successor systems (for example, LTE-A (LTE Advanced), NR (New Radio) (also referred to as 5G)), a D2D (Device to Device) technology in which terminals communicate directly with each other without using base stations is being discussed (for example, Non-Patent Reference 1).

The D2D reduces traffic between the terminals and the base stations and enables communication between the terminals even when the base stations are unable to perform communications during a disaster, and the like. Note that, the 3GPP (3rd Generation Partnership Project) refers to D2D as a "sidelink", but the more generic term D2D is used herein. However, in the description of embodiments below, the sidelink is also used as needed.

The D2D communication is broadly classified into D2D discovery for discovering other terminals capable of communication and D2D communication (also referred to as D2D direct communication, D2D communication, direct communication between terminals, etc.) for communicating directly between terminals. Hereinafter, when D2D communication and D2D discovery are not specifically distinguished, they are simply called D2D. Also, a signal transmitted and received by D2D is called a D2D signal. Various use cases of V2X (Vehicle to Everything) services in NR have been discussed (for example, Non-Patent Reference 2).

RELATED ART

Non-Patent Reference

[Non-Patent Reference 1] 3GPP TS 38.211 V16.2.0 (2020 June)
[Non-Patent Reference 2] 3GPP TR 22.886 V15.1.0 (2017 March)

SUMMARY

Technical Problem

In NR sidelink release 16, a sidelink HARQ (Hybrid automatic repeat request)-ACK can be reported from a terminal to a base station via an uplink. In addition, in a case where HARQ-ACK bits in a plurality of sidelinks are multiplexed, a HARQ-ACK codebook can be used.

Here, there is a case in which a plurality of HARQ-ACK codebooks in the downlink are configured. When a plurality of HARQ-ACK codebooks are configured, it is unclear which HARQ-ACK codebook is to be used by the terminal for a report to the base station, in which the HARQ-ACK bits in the plurality of sidelinks are multiplexed.

In view of the above, it is an object of the present invention to report a plurality of HARQ (Hybrid automatic repeat request)-ACKs to a base station in direct communication between terminals.

Solution to Problem

According to the disclosed technology, a terminal is provided; the terminal includes: a receiving unit configured to receive, from a base station, one or more pieces of information specifying a plurality of codebooks for transmitting a response related to retransmission control to be applied to transmission and reception in a downlink; a controlling unit configured to determine which codebook among the plurality of codebooks is a codebook for transmitting a response related to retransmission control to be applied to transmission and reception in a sidelink; and a transmitting unit configured to transmit to the base station, by using the determined codebook, one or more responses related to retransmission control to be applied to transmission and reception in the sidelink. [Beneficial Effect of the Invention]

According to the disclosed technology, a plurality of HARQ (Hybrid automatic repeat request)-ACKs can be reported to a base station in direct communication between terminals.

BRIEF DESCRIPTION OF THE DRAWINGS

FIG. 12 A sequence chart illustrating an example (3) of V2X operation.

DETAILED DESCRIPTION

Embodiments of the present invention are described below with reference to the drawings. It should be noted that the embodiments described below are examples and the embodiments to which the present invention is applied are not limited to the following embodiments.

Conventional technologies are appropriately used in the operation of the wireless communication system according to an embodiment of the present invention. Note that, although the conventional technologies include, for example, conventional LTE, the conventional technologies are not limited to the conventional LTE. Further, the term "LTE" used herein should have a broad meaning including LTE-Advanced and techniques after LTE-Advanced (for example, NR) or wireless LAN (Local Area Network) unless otherwise specified.

Further, in the embodiments of the present invention, a duplex method may be a TDD (Time Division Duplex) method, an FDD (Frequency Division Duplex) method, or any other method (for example, Flexible Duplex method).

Further, in the embodiments of the present invention, "configuring" a wireless parameter and the like may mean "pre-configuring" a predetermined value or configuring a wireless parameter indicated by a base station 10 or a terminal 20.

Figure 1:
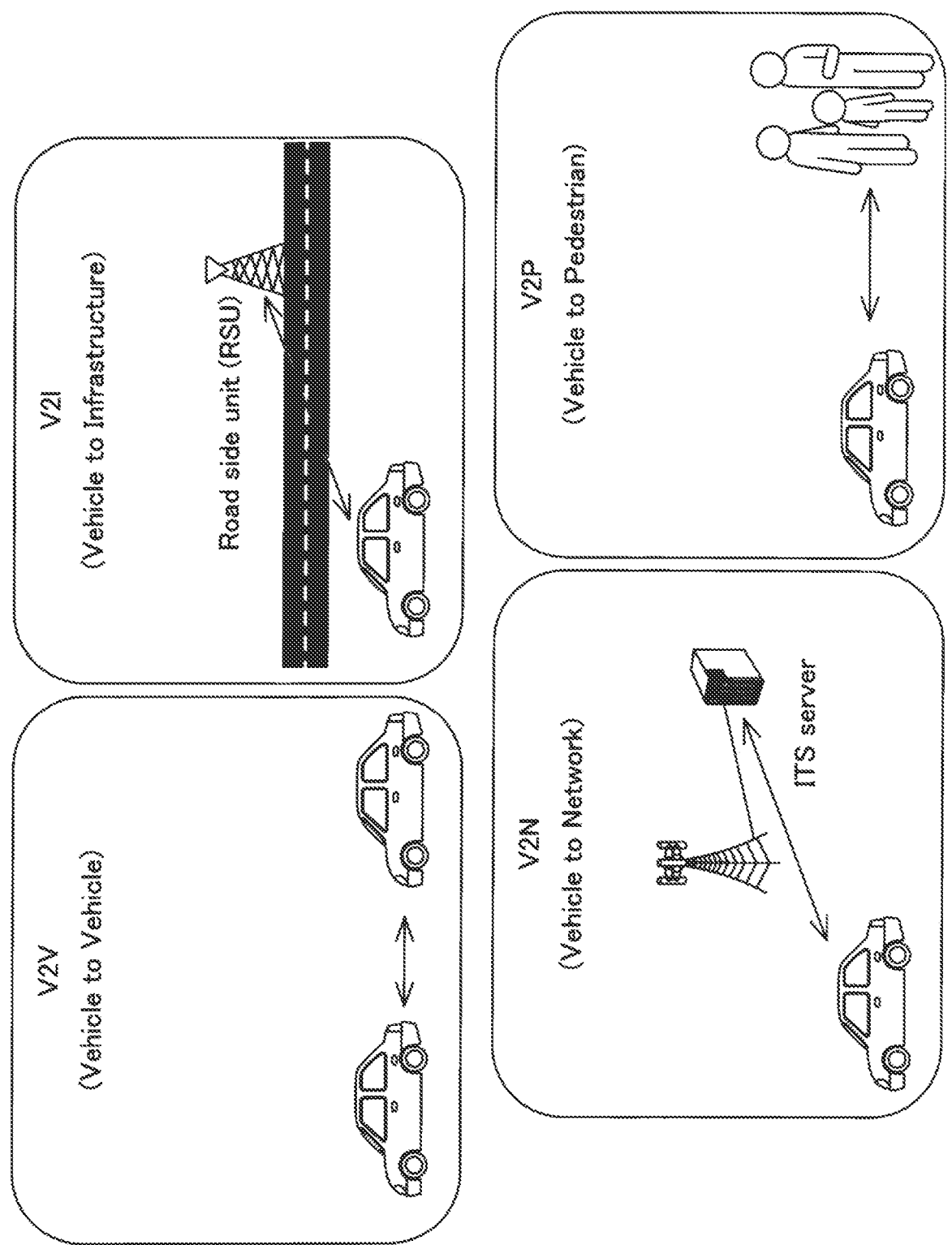
FIG. 1 A drawing illustrating V2X.

FIG. 1 is a drawing illustrating V2X. In 3GPP, enhancing D2D functions to realize V2X (Vehicle to Everything) or eV2X (enhanced V2X) has been discussed and specifications are being developed. As shown in FIG. 1, V2X is a part of ITS (Intelligent Transport Systems) and is a generic name for V2V (Vehicle to Vehicle) referring to a form of communication performed between vehicles; V2I (Vehicle to Infrastructure) referring to a form of communication performed between a vehicle and a road-side unit (RSU) installed on roadside; V2N (Vehicle to Network) referring to a form of communication performed between a vehicle and an ITS server; and V2P (Vehicle to Pedestrian) referring to a form of communication performed between a vehicle and a mobile terminal that is carried by a pedestrian.

In addition, in 3GPP, V2X using LTE/NR's cellular communication and communication between terminals has been discussed. V2X using cellular communication may be referred to as cellular V2X. In NR V2X, discussions are ongoing to realize higher capacity, reduced latency, higher reliability, QoS (Quality of Service) control.

It is assumed that discussions with regard to LTE/NR V2X that may not be limited to 3GPP specifications will also be performed in the future. For example, it is assumed that the following will be discussed: how to secure interoperability; how to reduce cost by implementing higher layers; how to use or how to switch a plurality of RATs (Radio Access Technologies); how to handle regulations of each country; how to acquire and deliver data of LTE/NR V2X platform; and how to manage and utilize databases.

In an embodiment of the present invention, an embodiment in which communication apparatuses are mounted on vehicles is mainly assumed. However, an embodiment of the present invention is not limited to such an embodiment. For example, communication apparatuses may be terminals carried by people, may be apparatuses mounted on drones or aircrafts, or may be base stations, RSUs, relay stations (relay nodes), terminals capable of scheduling, and the like.

Note that, SL (Sidelink) may be distinguished from UL (Uplink) or DL (Downlink), based on any one of, or any combination of the following 1) to 4). In addition, SL may have a different name.

1) Resource arrangement in the time domain
2) Resource arrangement in the frequency domain
3) Synchronization signals to be referred to (including SLSS (Sidelink Synchronization Signal))
4) Reference signal used for path loss measurement for transmission power control In addition, with regard to OFDM (Orthogonal Frequency Division Multiplexing) of SL or UL, any of CP-OFDM (Cyclic-Prefix OFDM), DFT-S-OFDM (Discrete Fourier Transform-Spread-OFDM), OFDM without Transform precoding, and OFDM with Transform precoding may be applied.

In LTE SL, with regard to allocating SL resources to the terminals 20, a Mode 3 and a Mode 4 are specified. In Mode 3, the transmission resources are dynamically allocated using a DCI (Downlink Control Information) that is transmitted from a base station 10 to a terminal 20. In addition, in Mode 3, SPS (Semi Persistent Scheduling) is also available. In Mode 4, a terminal 20 autonomously selects transmission resources from a resource pool.

Note that a slot in an embodiment of the present invention may be read as (i.e. replaced with) a symbol, a mini slot, a subframe, a radio frame, or a TTI (Transmission Time Interval). In addition, a cell in an embodiment of the present invention may be read as a cell group, a carrier component, a BWP, a resource pool, a resource, a RAT (Radio Access Technology), a system (including a wireless LAN), and the like.

Note that, in an embodiment of the present invention, the terminal 20 is not limited to V2X terminals, but may be any type of terminal that performs D2D communication. For example, the terminal 20 may be a terminal that is carried by a user, such as a smartphone, or may be an IoT (Internet of Things) device such as a smart meter.

Figure 2:
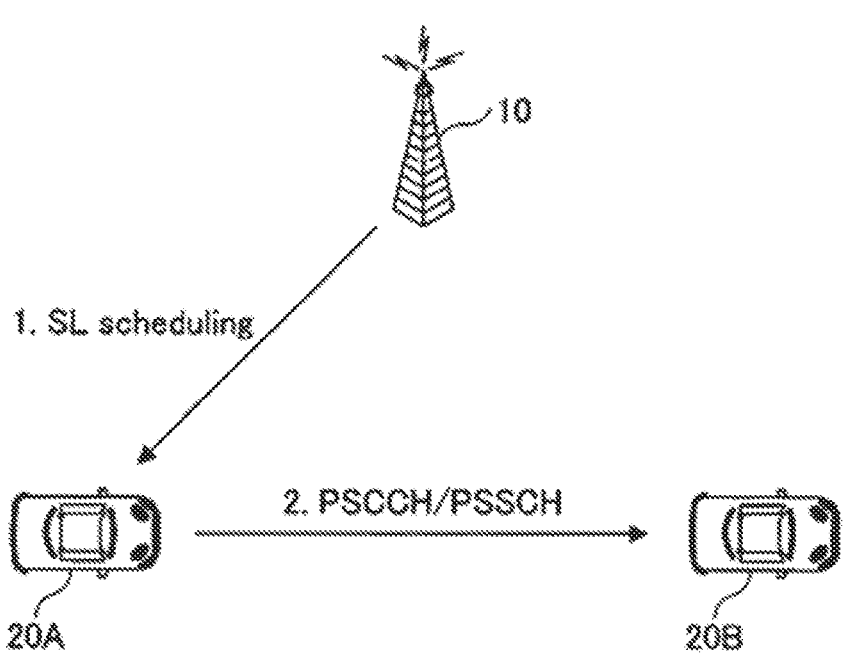
FIG. 2 A drawing illustrating an example (1) of a V2X transmission mode.

FIG. 2 is a drawing illustrating an example (1) of a V2X transmission mode. In the transmission mode of the sidelink communication shown in FIG. 2, in step 1, a base station 10 transmits a sidelink scheduling to a terminal 20A. Next, the terminal 20A transmits PSCCH (Physical Sidelink Control Channel) and PSSCH (Physical Sidelink Shared Channel) to a terminal 20B based on the received scheduling (step 2). The transmission mode of the sidelink communication shown in FIG. 2 may be called a sidelink transmission mode 3 in LTE. In the sidelink transmission mode 3 in LTE, Uu based sidelink scheduling is performed. Uu is a radio interface between UTRAN (Universal Terrestrial Radio Access Network) and UE (User Equipment). Note that, the transmission mode of the side link communication shown in FIG. 2 may be referred to as a side link transmission mode 1 in NR.

Figure 3:
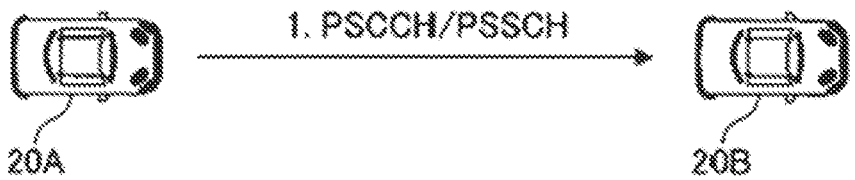
FIG. 3 A drawing illustrating an example (2) of a V2X transmission mode.

FIG. 3 is a drawing illustrating an example (2) of a V2X transmission mode. In the transmission mode of the sidelink communication shown in FIG. 3, in step 1, a terminal 20A transmits PSCCH and PSSCH to a terminal 20B using autonomously selected resources. The transmission mode of the sidelink communication shown in FIG. 3 may be called a sidelink transmission mode 4 in LTE. In the sidelink transmission mode 4 in LTE, the UE itself performs resource selection.

Figure 4:
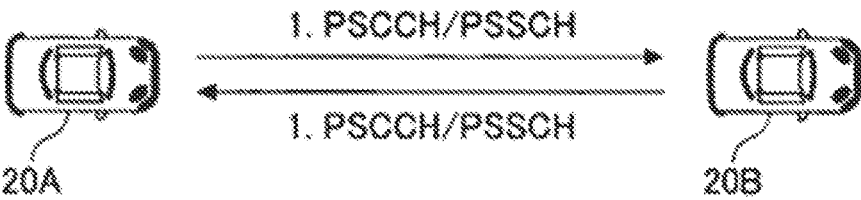
FIG. 4 A drawing illustrating an example (3) of a V2X transmission mode.

FIG. 4 is a drawing illustrating an example (3) of a V2X transmission mode. In the transmission mode of the sidelink communication shown in FIG. 4, in step 1, a terminal 20A transmits PSCCH and PSSCH to a terminal 20B using autonomously selected resources. Similarly, the terminal 20B transmits PSCCH and PSSCH to the terminal 20A using autonomously selected resources (step 1). The transmission mode of the sidelink communication shown in FIG. 4 may be called a sidelink transmission mode 2a in NR. In the sidelink transmission mode 2 in NR, the terminal 20 itself performs resource selection.

Figure 5:
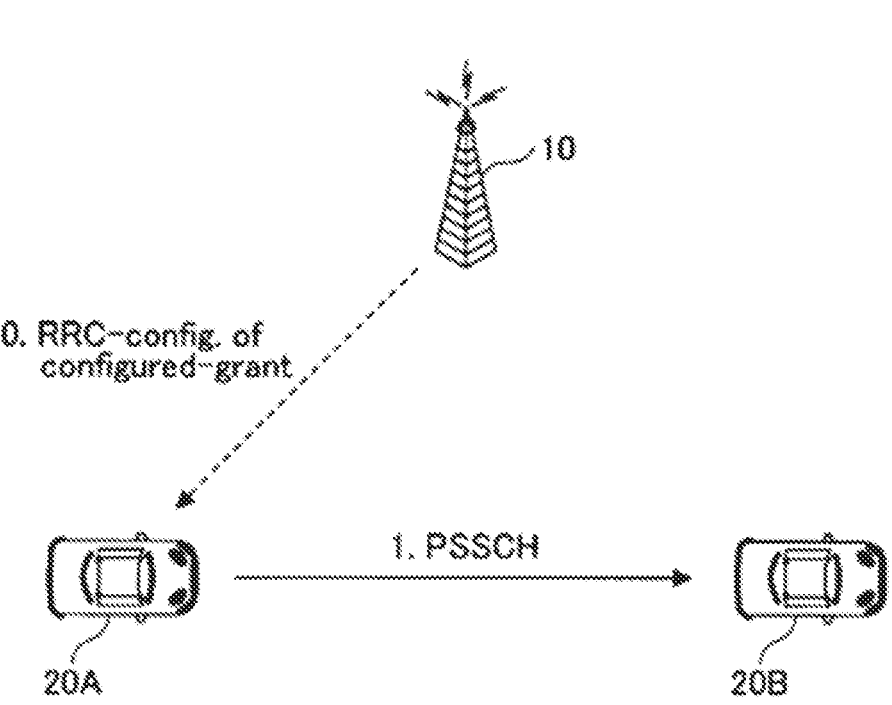
FIG. 5 A drawing illustrating an example (4) of a V2X transmission mode.

FIG. 5 is a drawing illustrating an example (4) of a V2X transmission mode. In the transmission mode of the sidelink communication shown in FIG. 5, in step 0, a side link resource pattern is transmitted from a base station 10 to a terminal 20A via RRC (Radio Resource Control) settings, or is set in advance. Next, the terminal 20A transmits PSSCH to a terminal 20B based on the resource pattern (step 1). The transmission mode of the sidelink communication shown in FIG. 5 may be called a sidelink transmission mode 2c in NR.

Figure 6:
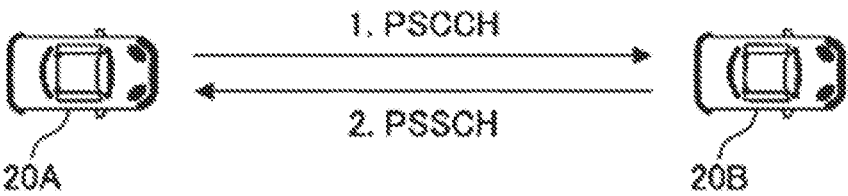
FIG. 6 A drawing illustrating an example (5) of a V2X transmission mode.
Figure 7:
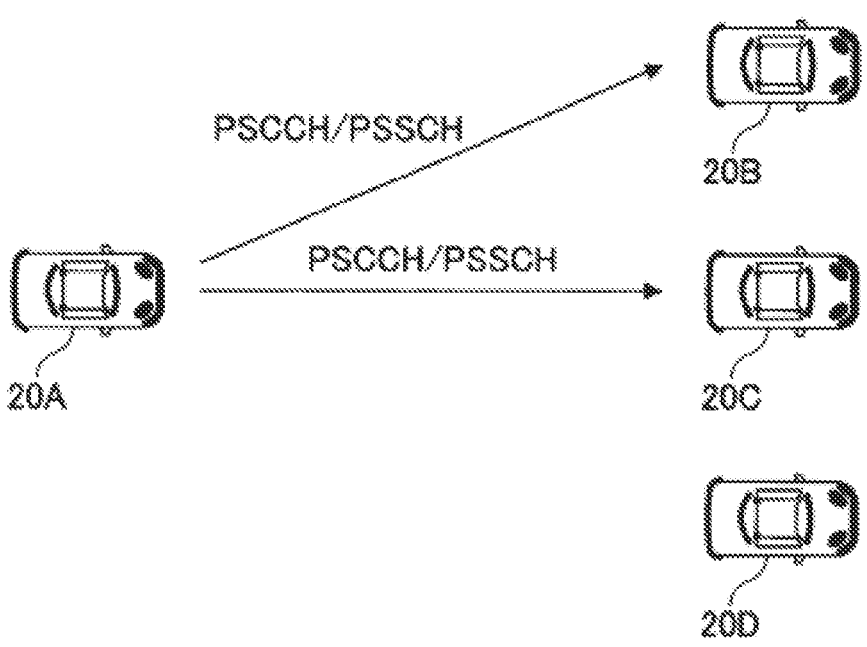
FIG. 7 A drawing illustrating an example (1) of a V2X communication type.

FIG. 6 is a drawing illustrating an example (5) of a V2X transmission mode. In the transmission mode of the sidelink communication shown in FIG. 6, in step 1, a terminal 20A transmits a sidelink scheduling to a terminal 20B via PSCCH. Next, the terminal 20B transmits PSSCH to the terminal 20A based on the received scheduling (step 2). The transmission mode of the sidelink communication shown in FIG. 6 may be called a sidelink transmission mode 2d in NR. FIG. 7 is a drawing illustrating an example (1) of a V2X communication type.

The sidelink communication type shown in FIG. 7 is unicast. A terminal 20A transmits PSCCH and PSSCH to a terminal 20. In the example shown in FIG. 7, the terminal 20A performs unicast to a terminal 20B, and performs unicast to a terminal 20C.

Figure 8:
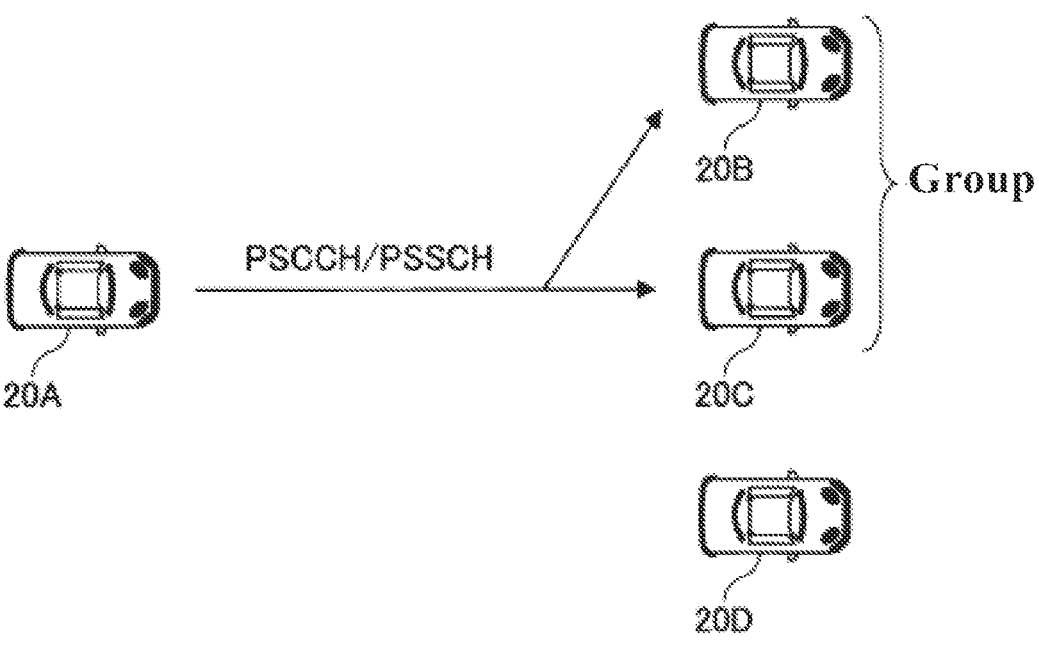
FIG. 8 A drawing illustrating an example (2) of a V2X communication type.

FIG. 8 is a drawing illustrating an example (2) of a V2X communication type. The sidelink communication type shown in FIG. 8 is group-cast. A terminal 20A transmits PSCCH and PSSCH to a group to which one or more terminals 20 belong. In the example shown in FIG. 8, the group includes a terminal 20B and a terminal 20C, and the terminal 20A performs groupcast to the group.

Figure 9:
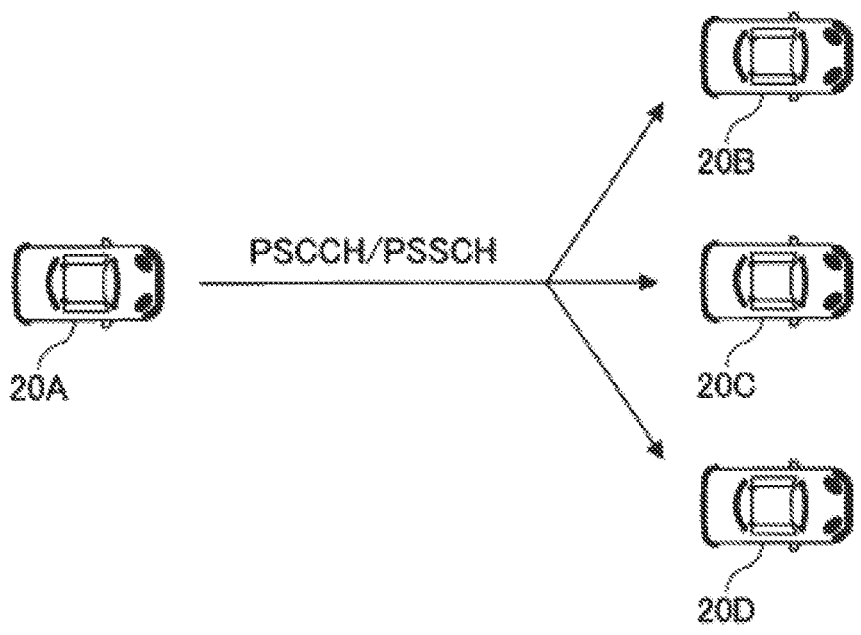
FIG. 9 A drawing illustrating an example (3) of a V2X communication type.

FIG. 9 is a drawing illustrating an example (3) of a V2X communication type. The sidelink communication type shown in FIG. 9 is broadcast. A terminal 20A transmits PSCCH and PSSCH to one or more terminals 20. In the example shown in FIG. 9, the terminal 20A performs broadcast to a terminal 20B, a terminal 20C, and a terminal 20D. Note that, the terminals 20A shown in FIG. 7 to FIG. 9 may be referred to as a header-UE.

In addition, in NR-V2X, it is assumed that HARQ (Hybrid automatic repeat request) is supported for unicasts and groupcasts of sidelinks. Furthermore, in NR-V2X, SFCI (Sidelink Feedback Control Information) including an HARQ response is defined. Furthermore, the transmission of SFCI via PSFCH (Physical Sidelink Feedback Channel) is also under consideration.

Note that, in the following description, PSFCH is used for transmitting a sidelink HARQ-ACK. However, this is just an example. For example, PSCCH may be used to transmit a sidelink HARQ-ACK, PSSCH may be used to transmit a sidelink HARQ-ACK, or other channels may be used to transmit a sidelink HARQ-ACK.

Hereafter, for the sake of convenience, the overall information reported by the terminal 20 in HARQ may be called HARQ-ACK. This HARQ-ACK may also be referred to as HARQ-ACK information. More specifically, the codebook applied to the HARQ-ACK information reported from the terminal 20 to a base station 10 and the like, is called the HARQ-ACK codebook. The HARQ-ACK codebook defines a bit sequence of HARQ-ACK information. Note that, NACK is also transmitted in addition to ACK by "HARQ-ACK".

Figure 10:
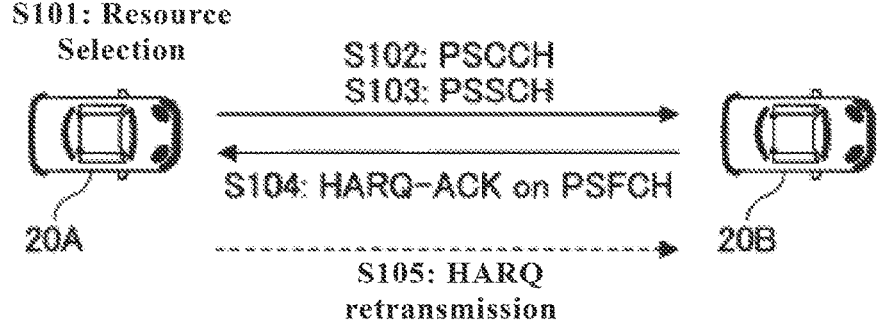
FIG. 10 A sequence chart illustrating an example (1) of V2X operation.

FIG. 10 is a sequence chart illustrating an example (1) of V2X operation. As shown in FIG. 10, the wireless communication system according to an embodiment of the present invention may have a terminal 20A and a terminal 20B. Note that, there are many user apparatuses in actuality; however, FIG. 10 shows the terminal 20A and the terminal 20B as examples.

Hereafter, when the terminals 20A, 20B and the like are not particularly distinguished, they are simply described as "terminals 20" or "user apparatuses". FIG. 10 illustrates, as an example, the case where the terminal 20A and the terminal 20B are both in cell coverage, but the operation according to an embodiment of the present invention is also applicable when the terminal 20B is outside of coverage.

As mentioned above, in an embodiment of the present invention, the terminal 20 is, for example, a device installed in a vehicle, such as an automobile, and has a function of cellular communication as a UE in LTE or NR and a sidelink function. The terminal 20 may be a conventional portable terminal (such as a smartphone). The terminal 20 may also be an RSU. Such RSU may be a UE-type RSU having the function of a UE or a gNB-type RSU having the function of a base station apparatus.

Note that, the terminal 20 need not be a single housing device. For example, even if various sensors are distributed throughout the vehicle, the device including the various sensors may be the terminal 20.

In addition, the processing contents of the transmission data of sidelink of the terminal 20 are basically the same as the processing contents of the UL transmission in LTE or NR. For example, the terminal 20 scrambles the code words of the transmission data, modulates them to generate complex-valued symbols, and maps the complex-valued symbols (transmission signals) to one or two layers for precoding. The precoded complex-valued symbols are then mapped to resource elements to generate a transmission signal (for example, complex-valued time-domain SC-FDMA signal), which is transmitted from each antenna port.

Note that, the base station 10 has a function of cellular communication as a base station in LTE or NR, and a function to enable the communication of the terminal 20 according to the present embodiment (for example, resource pool configuration, and resource allocation). In addition, the base station 10 may be an RSU (gNB-type RSU).

In addition, in a wireless communication system according to an embodiment of the present invention, a signal waveform used by the terminal 20 for SL or UL may be OFDMA, SC-FDMA, or another signal waveform.

In step S101, the terminal 20A autonomously selects resources to be used for PSCCH and PSSCH from a resource selection window having a predetermined time period. The resource selection window may be configured from the base station 10 to the terminal 20. Here, with regard to the predetermined time period of the resource selection window, the period may be defined by the terminal implementation conditions, such as processing time or maximum allowable packet delay time, or the period may be defined in advance by specifications, or the predetermined time period may be called an interval in the time domain.

In step S102 and step S103, the terminal 20A transmits SCI (Sidelink Control Information) by PSCCH and/or PSSCH and SL data by PSSCH, using the resources selected autonomously in the step S101. For example, the terminal 20A may transmit the PSCCH using a frequency resource adjacent to the frequency resource of the PSSCH in the same time resource as at least part of the time resource of the PSSCH.

A terminal 20B receives the SCI (PSCCH and/or PSSCH) and SL data (PSSCH) transmitted from the terminal 20A. The received SCI may include information of the PSFCH resources for the terminal 20B to transmit an HARQ-ACK for receiving such data. The terminal 20A may include information of the autonomously selected resources in the SCI and transmit the SCI with the information of the autonomously selected resources included.

In step S104, the terminal 20B transmits an HARQ-ACK for the received data to the terminal 20A using the resources of the PSFCH determined from the received SCI.

In step S105, the terminal 20A retransmits the PSCCH and PSSCH to the terminal 20B if the HARQ-ACK received in step S104 indicates that retransmission is requested, i.e., in the case of NACK (negative response). The terminal 20A may retransmit the PSCCH and PSSCH using autonomously selected resources.

Note that, if the HARQ control with HARQ feedback is not performed, the steps S104 and S105 need not be performed.

Figure 11:
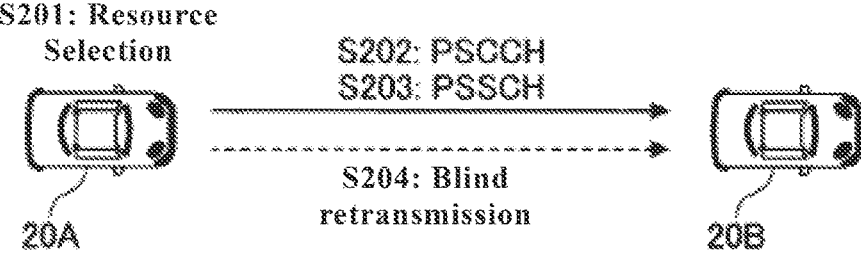
FIG. 11 A sequence chart illustrating an example (2) of V2X operation.

FIG. 11 is a sequence chart illustrating an example (2) of V2X operation. A non-HARQ-control-based blind retransmission may be performed to improve transmission success rate or reachability.

In step S201, a terminal 20A autonomously selects resources to be used for PSCCH and PSSCH from a resource selection window having a predetermined time period. The resource selection window may be configured to the terminal 20 by the base station 10.

In step S202 and step S203, the terminal 20A transmits SCI by PSCCH and/or PSSCH and SL data by PSSCH, using the resources selected autonomously in step S201. For example, the terminal 20A may transmit the PSCCH using a frequency resource adjacent to the frequency resource of the PSSCH in the same time resource as at least part of the time resource of the PSSCH.

In step S204, the terminal 20A retransmits the SCI by PSCCH and/or PSSCH and the SL data by PSSCH to the terminal 20B, using the resources selected autonomously in step S201. The retransmission in step S204 may be performed a plurality of times.

Note that, if blind retransmission is not performed, step S204 need not be performed.

Figure 12:
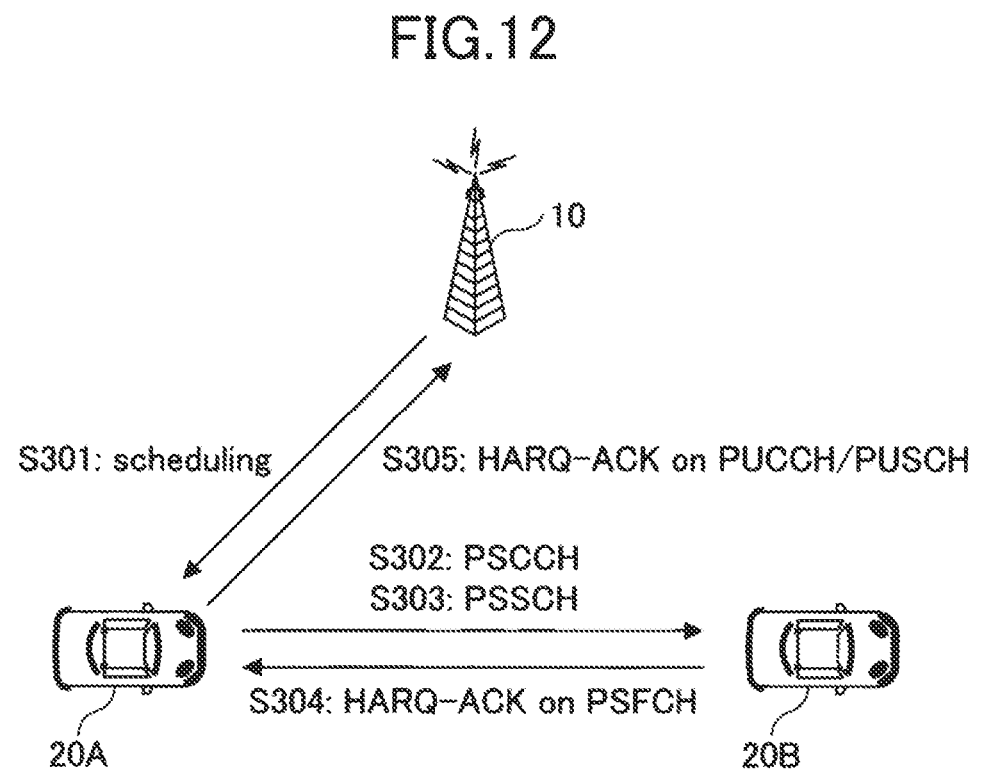

FIG. 12 is a sequence chart illustrating an example (3) of V2X operation. A base station 10 may perform a sidelink scheduling. That is, the base station 10 may determine the resources of the sidelink to be used by a terminal 20 to transmit information indicating such resources to a terminal 20. Furthermore, if HARQ control with HARQ feedback is applied, the base station 10 may transmit information indicating the resources of PSFCH to the terminal 20.

In step S301, the base station 10 performs SL scheduling by transmitting DCI (Downlink Control Information) to a terminal 20A by PDCCH. Hereafter, for the sake of convenience, the DCI for SL scheduling is called SL scheduling DCI.

In addition, in step S301, it is assumed that the base station 10 also transmits DCI for DL scheduling (which may be called DL allocation) to the terminal 20A by PDCCH. Hereafter, for the sake of convenience, the DCI for DL scheduling is called DL scheduling DCI. The terminal 20A that received the DL scheduling DCI, receives DL data by PDSCH using the resources specified in the DL scheduling DCI.

In step S302 and step S303, the terminal 20A transmits SCI (Sidelink Control Information) by PSCCH and/or PSSCH and SL data by PSSCH, using the resources specified in the SL scheduling DCI. Note that, the resources of PSSCH alone may be specified in the SL scheduling DCI. In this case, for example, the terminal 20A may transmit the PSCCH using a frequency resource adjacent to the frequency resource of the PSSCH in the same time resource as at least part of the time resource of the PSSCH.

A terminal 20B receives the SCI (PSCCH and/or PSSCH) and SL data (PSSCH) transmitted from the terminal 20A. The SCI received by the PSCCH and/or PSSCH includes information of the resources of the PSFCH for the terminal 20B to transmit an HARQ-ACK for receiving such data.

The information of the resource is included in the DL scheduling DCI or SL scheduling DCI transmitted from the base station 10 in step S301, and the terminal 20A obtains the information of the resource from the DL scheduling DCI or SL scheduling DCI and includes it in the SCI. Alternatively, the DCI transmitted from the base station 10 may not include information of the resource, and the terminal 20A may autonomously include information of the resource in the SCI and then transmit the SCI with the autonomously included information of the resource.

In step S304, the terminal 20B transmits an HARQ-ACK for the received data to the terminal 20A using the resources of the PSFCH determined from the received SCI.

In step S305, the terminal 20A transmits an HARQ-ACK at the timing (for example, a timing in unit of slot) specified by the DL scheduling DCI (or SL scheduling DCI) using the PUCCH (Physical uplink control channel) resource specified by the DL scheduling DCI (or the SL scheduling DCI), and the base station 10 receives the HARQ-ACK. The codebook of the HARQ-ACK may include a HARQ-ACK received from terminal 20B or an ARQ-ACK generated based on a PSFCH not received, and a HARQ-ACK for DL data. However, when there is no DL data allocation and the like, the HARQ-ACK for DL data is not included. In NR Rel. 16, the codebook of the HARQ-ACK does not include the HARQ-ACK for DL data.

Note that, if HARQ control with HARQ feedback is not performed, step S304 and/or step S305 need not be performed.

Figure 13:
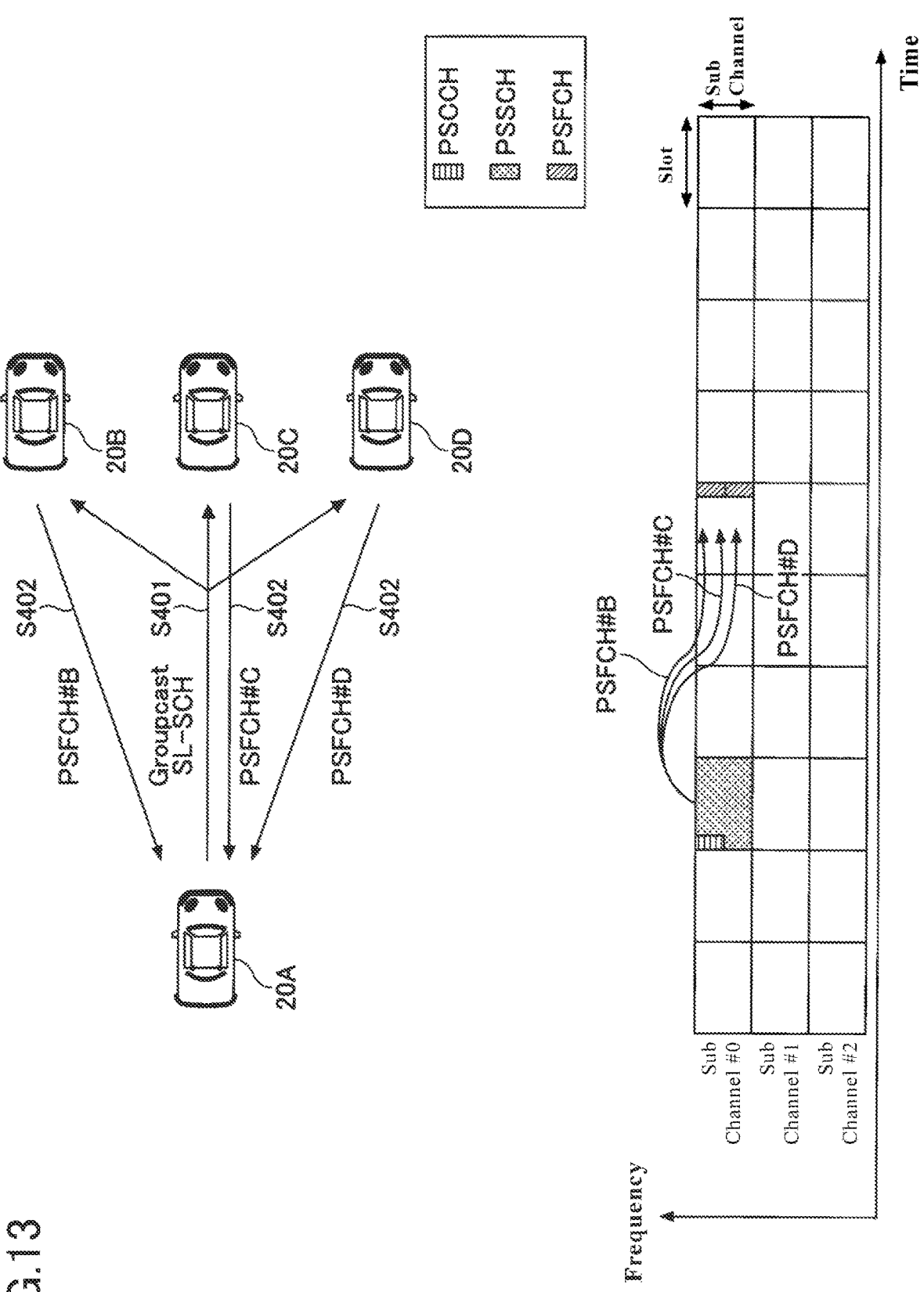
FIG. 13 A sequence chart illustrating an example (4) of V2X operation.

FIG. 13 is a sequence chart illustrating an example (4) of V2X operation. In the NR sidelink as described above, the transmission of an HARQ response is supported by PSFCH. Note that, a PSFCH format that can be used is the same as, for example, PUCCH (Physical Uplink Control Channel) format 0. That is, the PSFCH format may be a sequence-based format where the PRB (Physical Resource Block) size is 1 and an ACK and a NACK are identified by sequence and/or cyclic shift differences. The PSFCH format is not limited to this. The PSFCH resources may be placed in the last symbol or a plurality of last symbols of a slot. In addition, the PSFCH resources also have a configured or predefined period N. The period N may be configured or predefined in unit of slot.

In FIG. 13, the vertical axis corresponds to the frequency domain and the horizontal axis corresponds to the time domain. PSCCH may be placed in one symbol at the beginning of a slot, in a plurality of symbols from the beginning, or in a plurality of symbols from symbols other than the beginning. PSFCH may be placed in one symbol at the end of the slot or in a plurality of symbols at the end of the slot. Note that, for the aforementioned "beginning of the slot" and "end of the slot", considerations about symbols for AGC (Automatic Gain Control) and symbols for transmission/reception switching may be omitted. That is, for example, if a slot is comprised of 14 symbols, "beginning of the slot" and "end of the slot" may mean the first and last symbols from among the 12 symbols, excluding the first symbol and the last symbol. In an example shown in FIG. 13, three subchannels are configured in the resource pool, and two PSFCHs are placed in the third slot after a slot in which the PSSCH is placed. The arrows from PSSCH to PSFCH show examples of PSFCHs associated with PSSCHs.

In a case where an HARQ response in the NR-V2X groupcast is groupcast option 2 for transmitting an ACK or NACK, it is necessary to determine the resources to be used for transmission and reception of PSFCH. As shown in FIG. 13, in step S401, a terminal 20A, which is a transmission side terminal 20, performs groupcast to terminals 20B, 20C, and 20D, which are reception side terminals 20, via SL-SCH. Next, in step S402, the terminal 20B uses PSFCH #B, the terminal 20C uses PSFCH #C, and the terminal 20D uses PSFCH #D to transmit the HARQ response to the terminal 20A. Here, as shown in the example in FIG. 13, in a case where the number of available PSFCH resources is less than the number of reception side terminals 20 belonging to the group, it is necessary to determine how to allocate the PSFCH resources. Note that, the transmission side terminals 20 may have the number of reception side terminals 20 in groupcast. Note that, in the groupcast option 1, only a NACK is transmitted as an HARQ response, and an ACK is not transmitted.

In NR sidelink release 16, the terminal 20 may report a sidelink HARQ-ACK to a base station 10. In addition, the terminal 20 may perform reporting to the base station 10 by multiplexing a plurality of sidelink HARQ-ACKs. When one or more HARQ-ACK bits are transmitted over a single channel, a set of the HARQ-ACK bits may be called an HARQ-ACK codebook. Regarding the HARQ-ACK code-book, type 1, which is a semi-static codebook, and type 2, which is a dynamic codebook, are both supported. When reporting the sidelink HARQ-ACK from the terminal 20 to the base station 10, which of type 1 or type 2 of the HARQ-ACK codebook is to be used may be based on the codebook that is used in the downlink HARQ-ACK.

Regarding the codebooks for HARQ feedback corresponding to downlink reception, NR eURLLC (enhanced Ultra-Reliable and Low Latency Communications) Release 16 allows up to two codebook types to be configured for a terminal 20. One codebook type corresponds to low priority and the other corresponds to high priority.

In addition, regarding the codebooks for HARQ feedback corresponding to downlink reception, the NR Release 16 allows up to two codebook types to be configured for a terminal 20 in a case where two PUCCH groups are configured for a cell group. One codebook type is configured for each of the PUCCH groups.

As described above, in a case where a plurality of codebook types are configured for the codebook used in a downlink HARQ-ACK, it is unclear which codebook should be used for the sidelink HARQ feedback (in a case of reporting a sidelink HARQ-ACK from the terminal 20 to the base station 10). Note that, the sidelink HARQ-ACK codebook is applied to the HARQ-ACK transmitted by PUCCH or PUSCH in step S305 shown in FIG. 12, but may also be applied to the HARQ-ACK transmitted by PSFCH in step S303.

In the above NR eURLLC Release 16, up to two codebook types for a terminal 20 are configured semi-statically or dynamically by the RRC information element "pdsch-HARQ-ACK-Codebook List-r16" indicated by the base station 10. The first codebook type included in the RRC information element corresponds to low priority, and the second codebook type corresponds to high priority. Hereafter, the "pdsch-HARQ-ACK-CodebookList-r16" is referred to as "pdsch-HARQ-ACK-CodebookList".

In addition, in the above NR Release 16, in a case where two PUCCH groups are configured for a cell group, the codebook type corresponding to the secondary PUCCH group is configured semi-statically or dynamically by the RRC information element "pdsch-HARQ-ACK-Codebook-secondary PUCCHgroup-r16" indicated by the base station 10. Hereafter, "pdsch-HARQ-ACK-Codebook-secondary PUCCHgroup-r16" is referred to as "pdsch-HARQ-ACK-Codebook-secondary PUCCHgroup".

Note that, a normally-used codebook type, or a codebook type corresponding to the primary PUCCH group in a case where two PUCCH groups are configured for a cell group, is configured semi-statically or dynamically by the RRC information element "pdsch-HARQ-ACK-Codebook" indicated by the base station 10. Note that, the parameter names according to an embodiment of the present invention are not limited to those listed above, and may be different names.

(HARQ-ACK Codebook)

Note that, in the examples below, an example of SL HARQ-ACK transmission from the terminal 20 to the base station 10 using the HARQ-ACK codebook is described. Therefore, firstly, an overview of the HARQ-ACK codebook corresponding to DL transmission is described.

In the case of generating the HARQ-ACK codebook for the SL HARQ-ACK transmission, the downlink may be replaced by the sidelink.

The HARQ-ACK codebook specifies how to collectively multiplex one or more HARQ-ACKs in a case where they are collectively multiplexed to be transmitted. The HARQ-ACK codebook may include bits for the HARQ-ACK in at least one of the following units of: a time domain (for example, slot); a frequency domain (for example, Component Carrier (CC)); a spatial domain (for example, layer); a Transport Block (TB); and a group of code blocks (Code Block Group (CBG)) forming a TB. Note that, a CC is also called cell, serving cell, carrier, or the like. In addition, such bits are also called HARQ-ACK bits, HARQ-ACK information or HARQ-ACK information bits, or the like. The HARQ-ACK codebook is also called PDSCH-HARQ-ACK codebook (pdsch-HARQ-ACK-Codebook), codebook, HARQ codebook, HARQ-ACK size, or the like.

The number of bits (size) and the like included in the HARQ-ACK codebook may be determined semi-statically or dynamically. A semi-static HARQ-ACK codebook is also called a Type I HARQ-ACK codebook, a semi-static code-book, or the like. A dynamic HARQ-ACK codebook is are also called a Type II HARQ-ACK codebook, a dynamic codebook, or the like.

Which of the Type I HARQ-ACK codebook or the Type II HARQ-ACK codebook is to be used may be configured to the terminal 20 by the upper layer parameters (for example, pdsch-HARQ-ACK-Codebook).

In the case of the Type I HARQ-ACK codebook, the terminal 20, in a predetermined range (for example, a range configured based on the upper layer parameters), may transmit, as feedback, the HARQ-ACK bits corresponding to the predetermined range regardless of the presence or absence of PDSCH scheduling.

The predetermined range may be determined based on at least one of the following: a predetermined time period (for example, a set of a predetermined number of occasions for receiving candidate PDSCH or a predetermined number of monitoring occasions for PDCCH) the number of CCs configured or activated in the terminal 20, the number of TBs (number of layers or ranks), the number of CBGs per TB, and presence or absence of application of the spatial bundling. The predetermined range is also called the HARQ- ACK bundling window, HARQ-ACK feedback window, bundling window, feedback window, or the like.

With respect to the Type I HARQ-ACK codebook, the terminal 20 feeds back the NACK bit within the predetermined range even if there is no PDSCH scheduling for the terminal 20. Therefore, in a case of using the Type I HARQ-ACK codebook, it is assumed that the number of HARQ-ACK bits to be transmitted as feedback is increased.

On the other hand, in the case of the Type II HARQ-ACK codebook, the terminal 20 may transmit, as feedback, HARQ-ACK bits for the scheduled PDSCH in the above predetermined range.

Specifically, the terminal 20 may determine the number of bits in the Type II HARQ-ACK codebook, based on a predetermined field in the DCI (for example, a Downlink Assignment Indicator (Index) (DAI) field). The DAI field may be split into a counter DAI (cDAI) and a total DAI (tDAI).

The counter DAI may indicate the counter value of the downlink transmissions (PDSCH, data, and TB) scheduled within a predetermined time period. For example, the counter DAI in DCI that schedules the data within the predetermined time period may indicate the number counted first in the frequency domain (for example, CC) and then in the time domain within the predetermined time period.

The total DAI may indicate the total value (total number) of data to be scheduled within the predetermined time period. For example, the Total DAI in DCI that schedules the data in a predetermined time unit (for example, PDCCH monitoring occasion) within the predetermined time period may indicate the total number of pieces of data scheduled up to the predetermined time unit (also called point, timing, and the like) within the predetermined time period.

The terminal 20 may transmit one or more HARQ-ACK bits determined (generated) based on the above Type I or Type II HARQ-ACK codebook using at least one of the uplink control channel (Physical Uplink Control Channel (PUCCH)) and the uplink shared channel (Physical Uplink Shared Channel (PUSCH)).

In the case of the Type I HARQ-ACK codebook, the terminal 20 generates the number of HARQ-ACK bits corresponding to the number of: candidate PDCCH/PD-SCHs that may be transmitted from the base station 10; rather than actual PDCCH/PDSCH transmissions from the base station 10. In other words, for PDCCH/PDSCH transmission occasions where PDCCH/PDSCH may be transmitted from the base station 10, the terminal 20 transmits the HARQ-ACK bits regardless of whether the PDCCH/PDSCH is actually transmitted/not transmitted from the base station 10. For example, for a PDCCH transmission occasion from the base station 10, the terminal 20 may transmit a NACK in a case where no PDCCH transmission is performed from the base station 10.

In the case of the Type II HARQ-ACK codebook, the terminal 20 generates the number of HARQ-ACK bits corresponding to the number of PDCCH/PDSCH signals that are assumed to be actually transmitted from the base station 10. Note that, the terminal 20 may be unable to receive the PDCCH signals from the base station 10; therefore, it is possible to include DAI in the DCI to indicate the number of PDCCH signals to be transmitted by the base station 10 to the terminal 20. For example, as shown on the left end of FIG. 14, even if a terminal 20 fails to detect the DL DCI indicated by (3, 0) from among the DL DCIs indicated by (1, 0), (2, 0), (3, 0) and (0, 0), the terminal 20 detects the DL DCI indicated by (2, 0) and the DL DCI indicated by (0, 0); and therefore, the terminal 20 can recognize that there is (3, 0) between (2, 0) and (0, 0) and configure the HARQ-ACK bit corresponding to (3, 0) to a NACK to be transmitted. Thus, in the case of the Type II HARQ-ACK codebook, the number of HARQ-ACK bits transmitted by the terminal 20 can be the same as the number of HARQ-ACK bits assumed on the base station 10 side.

Figure 14:
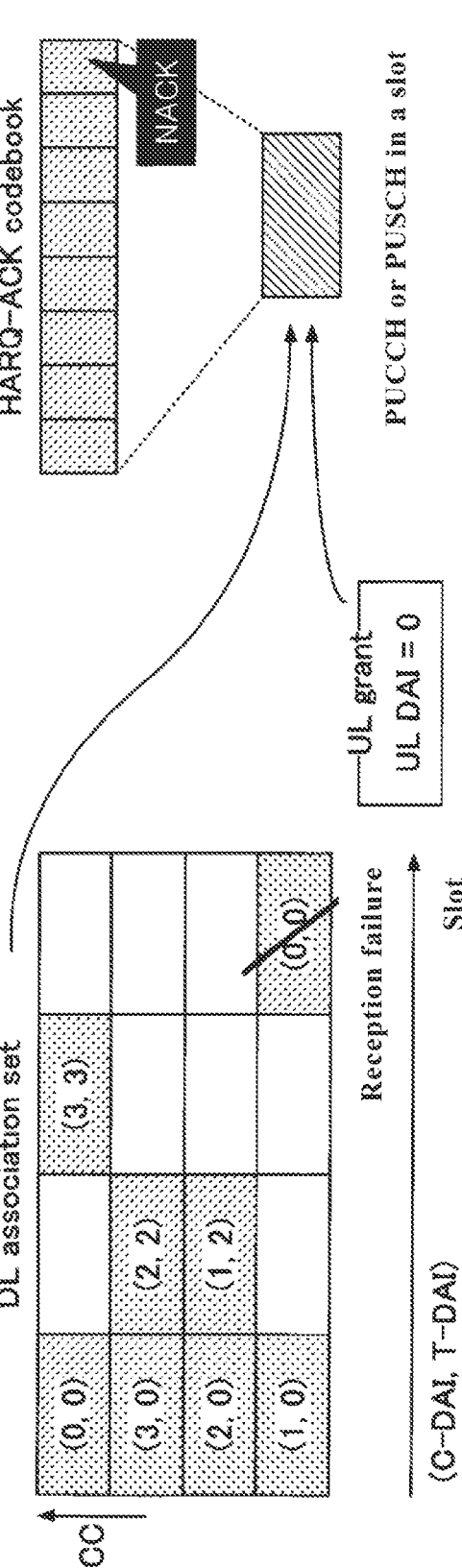
FIG. 14 A drawing illustrating an example of the operation of reporting a multiplexed HARQ-ACK.

A specific example of using the HARQ-ACK codebook corresponding to downlink reception is described here using FIG. 14. FIG. 14 is a drawing illustrating an example of reporting a multiplexed HARQ-ACK response. In a case where a PUCCH containing a HARQ-ACK collides with a PUSCH, the HARQ-ACK may be multiplexed with the PUSCH (in some cases, when a PUCCH containing an HARQ-ACK collides with a PUSCH, the PUSCH may be dropped). In the DCI scheduling the PUSCH, a DAI (Downlink assignment indicator) is transmitted, and based on the DAI value, the number of HARQ-ACKs that should be multiplexed with the PUSCH is indicated. The DAI in the DCI scheduling the PUSCH is a UL-DAI. Note that, the DAI in the DCI scheduling the PDSCH is a C-DAI (counter DAI) and/or T-DAI (total DAI). With DAI, it is possible to avoid a mismatch of the number of HARQ-ACK bits even in a case where the false detection of PDCCH occurs. Note that, hereafter, the C-DAI, UL-DAI, and T-DAI are the values defined by a remainder of 4, starting from 0. However, this definition is an example; the DAI may be defined by other methods as well.

FIG. 14 shows an example of failing to receive a PDCCH with (C-DAI, T-DAI)=(0, 0) in the fourth slot in the DL association set. The multiplexed HARQ-ACKs are 8 HARQ-ACKs, corresponding to (C-DAI, T-DAI) of (1, 0), (2, 0), (3, 0), (0, 0), (1, 2), (2, 2), (3, 3) and (0), 0), and thus, the UL-DAI becomes 8 mod 4=0. That is, as shown in FIG. 14, the value of the UL-DAI included in the DCI allocating PUSCH becomes 0. The value of UL-DAI=0, which is different from the value of UL-DAI (=3) expected from (C-DAI, T-DAI)=(3, 3) in the last received DCI, thereby indicating that the terminal 20 failed to receive PDCCH after the last DCI. That is, the terminal 20 can recognize that the number of bits of the HARQ-ACK codebook is 8, even though 7 PDCCHs were received due to failed PDCCH reception.

Figure 15:
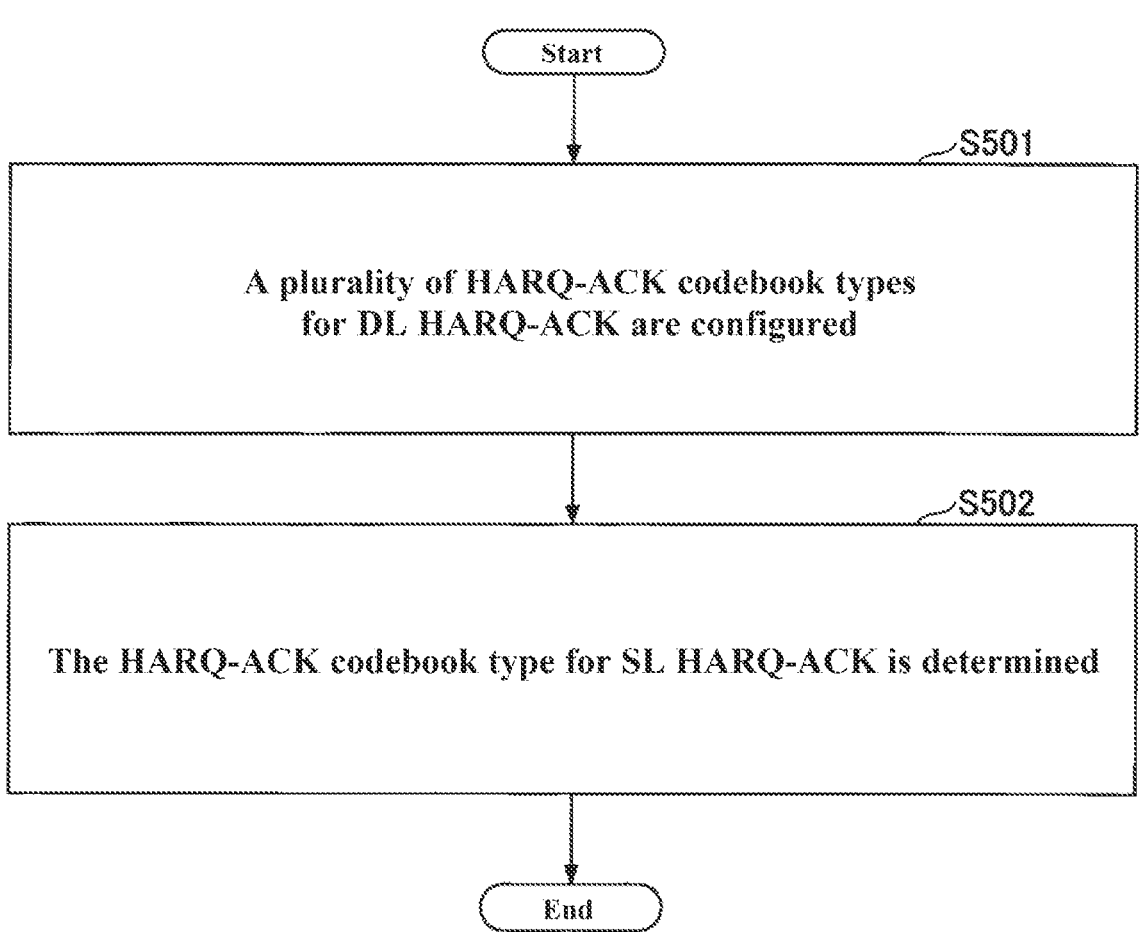
FIG. 15 A flowchart illustrating an example of the operation of reporting an HARQ-ACK according to an embodiment of the present invention.

As described above, in a case where a plurality of codebook types are configured, it is necessary to determine which codebook is to be used for sidelink HARQ feedback. FIG. 15 is a flowchart illustrating an example of the operation of reporting an HARQ-ACK according to an embodiment of the present invention. In step S501, a plurality of HARQ-ACK codebook types for a DL-HARQ-ACK are configured. Next, in subsequent step S502, a terminal 20 determines the HARQ-ACK codebook type for an SL-HARQ-ACK. Subsequently, the terminal 20 may report a plurality of HARQ-ACKs to a base station 10 using the determined HARQ-ACK codebook type.

In a case where the "pdsch-HARQ-ACK-CodebookList" is configured, in step S502, the terminal 20 may report the SL-HARQ-ACK to the base station 10 using the codebook type according to the "pdsch-HARQ-ACK-Codebook". That is, the "pdsch-HARQ-ACK-Codebook" is not required to be used to determine the codebook type for the DL-HARQ-ACK, but may be used to determine the codebook type for the SL-HARQ-ACK.

With the above operation, it is possible to determine a codebook for the SL-HARQ-ACK regardless of the presence or absence of the "pdsch-HARQ-ACK-CodebookList", thereby simplifying the terminal configuration.

In addition, in a case where the "pdsch-HARQ-ACK-CodebookList" is configured, in step S502, the terminal 20 may report an SL-HARQ-ACK to the base station 10 using the codebook type according to the "pdsch-HARQ-ACK-CodebookList".

For example, from among the "pdsch-HARQ-ACK-CodebookList", a first HARQ-ACK codebook type (having a low priority indicating associated priority index of 0) may be used.

For example, from among the "pdsch-HARQ-ACK-CodebookList", a second HARQ-ACK codebook type (having high priority indicating associated priority index of 1) may be used.

In addition, for example, which codebook type is to be used may be determined based on the priority of the SL-HARQ-ACK report to the base station 10, from among the "pdsch-HARQ-ACK-CodebookList". For example, the second HARQ-ACK codebook type may be used in a case where the priority is from 0 to X (corresponding to a higher priority) from among the priority range of 0 to 7. Further, the first HARQ-ACK codebook type may be used in a case where the priority is from X+1 to 7 (corresponding to a lower priority) from among the priority range of 0 to 7. X or X+1 may be determined based on the specific upper layer parameters, which may be, for example, one of "sl-Priority Threshold" or "sl-Priority Threshold-UL-URLLC".

With the above operation, the codebook type that is same as the codebook type actually used as the HARQ-ACK codebook type for DL-HARQ-ACK can be applied to SL. In addition, the most appropriate codebook type can be applied based on the priority of the SL.

Further, in a case where "pdsch-HARQ-ACK-CodebookList" is configured, in step S502, the terminal 20 may report the SL-HARQ-ACK to the base station 10 by determining the codebook type without depending on: the HARQ-ACK codebook type for DL-HARQ-ACK; or the upper layer parameters related to the HARQ-ACK codebook type for DL-HARQ-ACK. For example, the use of a semi-static codebook type or a dynamic codebook type may be specified in the specification. In addition, for example, the configuration may be performed by the upper layer parameters (for example, "pssch-HARQ-ACK-Codebook", "pssch-HARQ-ACK-CodebookList") for determining the HARQ-ACK codebook type for SL-HARQ-ACK, and the codebook type may be determined. Note that, in a case where a plurality of codebook types are configured according to "pssch-HARQ-ACK-CodebookList", the codebook type may be determined in the same manner as the method used for determining the codebook type, based on the "pdsch-HARQ-ACK-CodebookList" mentioned above.

With the above operation, the HARQ-ACK codebook type for SL-HARQ-ACK may be flexibly configured regardless of the HARQ-ACK codebook type for DL-HARQ-ACK.

In addition, in case a where "pdsch-HARQ-ACK-Codebook-secondary PUCCHgroup" is configured, in step S502, the terminal 20 may report SL-HARQ-ACK to the base station 10 using the codebook type according to "pdsch-HARQ-ACK-Codebook". That is, it is not necessary for the determination of the SL-HARQ-ACK codebook type to depend on the PUCCH group with which SL is associated, and "pdsch-HARQ-ACK-Codebook" may be used to determine the codebook type for SL-HARQ-ACK.

With the above operation, it is possible to determine the codebook for SL-HARQ-ACK regardless of the presence of absence of "pdsch-HARQ-ACK-Codebook-secondary PUCCHgroup", thereby simplifying the terminal configuration.

In addition, in a case where "pdsch-HARQ-ACK-Codebook-secondary PUCCHgroup" is configured, in step S502, the terminal 20 may report SL-HARQ-ACK to the base station 10 using the codebook type according to "pdsch-HARQ-ACK-Codebook-secondary PUCCHgroup". That is, the "pdsch-HARQ-ACK-Codebook-secondary PUCCHgroup" may be used to determine the codebook type for SL-HARQ-ACK without depending on the PUCCH group with which SL is associated.

With the above operation, it is possible to determine the codebook for SL-HARQ-ACK by preferentially using the additionally configured "pdsch-HARQ-ACK-Codebook-secondary PUCCHgroup".

In addition, in a case where "pdsch-HARQ-ACK-Codebook-secondary PUCCHgroup" is configured, in step S502, the terminal 20 may report SL-HARQ-ACK to the base station 10 using the codebook type determined by the parameters related to the PUCCH group with which SL is associated. For example, the terminal 20 may report the SL-HARQ-ACK to the base station 10 using the codebook type determined by the parameters related to the PUCCH group for the terminal 20 to transmit the SL-HARQ-ACK.

For example, in a case where the PUCCH group for the terminal 20 to transmit the SL-HARQ-ACK is a primary PUCCH group, i.e., in a case where PUCCH is transmitted in the primary cell or primary secondary cell group cell, the HARQ-ACK codebook type may be determined based on "pdsch-HARQ-ACK-Codebook".

For example, in a case where the PUCCH group for the terminal 20 to transmit the SL-HARQ-ACK is a secondary PUCCH group, i.e., in a case where PUCCH is transmitted in the secondary cell, the HARQ-ACK codebook type may be determined based on "pdsch-HARQ-ACK-Codebook-secondary PUCCHgroup".

With the above operation, it is possible to share the codebook type in the PUCCH group with which SL is associated, between the DL-HARQ-ACK codebook and the SL-HARQ-ACK codebook.

In addition, in case where a "pdsch-HARQ-ACK-Codebook-secondary PUCCHgroup" is configured, in step S502, the terminal 20 may report SL-HARQ-ACK to the base station 10 by determining the codebook type without depending on: the HARQ-ACK codebook type for DL-HARQ-ACK; or the upper layer parameters related to the HARQ-ACK codebook type for DL-HARQ-ACK. For example, the use of a semi-static codebook type or a dynamic codebook type may be specified in the specification. In addition, for example, the configuration may be performed by the upper layer parameters (for example, "pssch-HARQ-ACK-Codebook", "pssch-HARQ-ACK-CodebookList") for determining the HARQ-ACK codebook type for SL-HARQ-ACK, and the codebook type may be determined. Note that, in a case where a plurality of codebook types are configured according to "pssch-HARQ-ACK-CodebookList", the codebook type may be determined in the same manner as the method used for determining the codebook type, based on the "pdsch-HARQ-ACK-CodebookList" mentioned above.

With the above operation, the SL-HARQ-ACK codebook type may be flexibly configured regardless of the DL-HARQ-ACK codebook type.

In addition, in a case where "pdsch-HARQ-ACK-CodebookList" and "pdsch-HARQ-ACK-Codebook-secondary PUCCHgroup" are configured, in step S502, the terminal 20 may determine the SL-HARQ-ACK codebook type by using any of the methods described above.

For example, in a case where "pdsch-HARQ-ACK-Code-book-List" is used, instead of "pdsch-HARQ-ACK-Code-book-secondaryPUCCHgroup", in the secondary PUCCH group, the terminal 20 may determine the SL-HARQ-ACK codebook, based on the "pdsch-HARQ-ACK-Code-bookList". Further, for example, the terminal 20 may replace "pdsch-HARQ-ACK-Codebook" with "pdsch-HARQ-ACK-CodebookList" in the method for a case in which "pdsch-HARQ-ACK-Codebook-secondary PUCCHgroup" is configured.

In addition, in a case where "pdsch-HARQ-ACK-Code-bookList" for the secondary PUCCH group (for example "pdsch-HARQ-ACK-CodebookList-secondary PUCCH-group") is separately configured, in step S502, the terminal 20 may determine the SL-HARQ-ACK codebook type by using any of the methods described above. Note that, the "pdsch-HARQ-ACK-CodebookList" for the secondary PUCCH group means that the first codebook type included in this RRC information element may correspond to low priority in the secondary PUCCH group and the second codebook type in this RRC information element may correspond to high priority in the secondary PUCCH group.

For example, the terminal 20 may replace "pdsch-HARQ-ACK-Codebook" with "pdsch-HARQ-ACK-Code-bookList" in the method for a case where "pdsch-HARQ-ACK-Codebook-secondary PUCCHgroup" is configured. In addition, for example, the terminal 20 may replace "pdsch-HARQ-ACK-Codebook-secondary PUCCHgroup" with "pdsch-HARQ-ACK-CodebookList-secondary PUCCH-group" in the method for a case where "pdsch-HARQ-ACK-Codebook-secondary PUCCHgroup" is configured.

The above examples are not limited to V2X terminals, but may be applied to the terminals that perform D2D communications.

The operations according to the above examples may be applied to any case where the transmission is groupcast, the transmission is unicast, or the transmission is broadcast.

Note that, there may be a plurality of UEs or terminals 20, or UEs or terminals 20 may belong to the same group.

According to the above examples, the terminal 20 may determine the codebook type to be used for reporting a plurality of SL-HARQ-ACKs in a case where a plurality of HARQ-ACK codebooks are configured for DL reception.

That is, a plurality of HARQ (Hybrid automatic repeat request)-ACKs may be reported to the base station in direct communication between terminals.

(Device Configuration)

Next, an example of a functional configuration of the base station 10 and the terminal 20 that execute processes and operations described so far is described. The base station 10 and the terminal 20 have functions for performing the above embodiments. However, the base station 10 and the terminal 20 each may have only some of the functions in the embodiments.

<Base Station 10>

Figure 16:
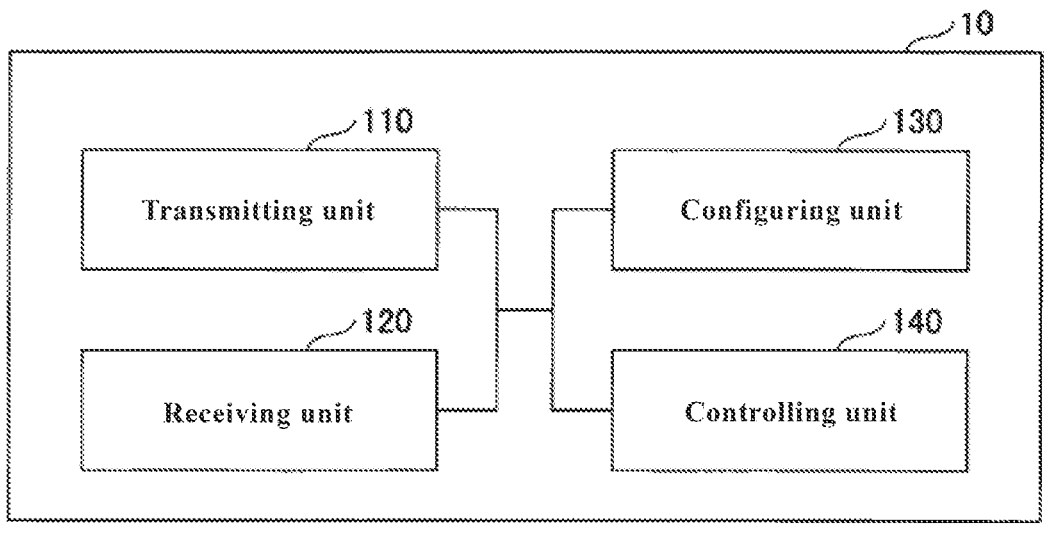
FIG. 16 A drawing illustrating an example of a functional configuration of a base station 10 according to an embodiment of the present invention.

FIG. 16 is a drawing illustrating an example of a functional configuration of a base station 10. As shown in FIG. 16, the base station 10 comprises a transmitting unit 110, a receiving unit 120, a configuring unit 130, and a controlling unit 140. The functional configuration shown in FIG. 16 is only an example. Any functional classification and any functional unit name may be used as long as the operations according to the embodiments of the present invention can be performed.

The transmitting unit 110 has a function of generating a signal to be transmitted to the terminal 20 side and transmitting the signal wirelessly. The receiving unit 120 has a function of receiving various signals transmitted from the terminal 20 and acquiring information of, for example, a higher layer from the received signals. In addition, the transmitting unit 110 has a function for transmitting NR-PSS, NR-SSS, NR-PBCH, DL/UL control signals, DL reference signals, and the like, to the terminal 20.

The configuring unit 130 stores, in the storage device, the pre-configured configuration information and various configuration information to be transmitted to the terminal 20 and reads them from the storage device if necessary. The contents of the configuration information are, for example, information related to the configuration of SL communication.

The controlling unit 140 performs processing related to the configuration used for SL communication performed by the terminal 20, as described in an embodiment of the present invention. The controlling unit 140 also transmits the scheduling of SL communication and DL communication to the terminal 20 via the transmitting unit 110. The controlling unit 140 also receives information related to HARQ responses for SL communication and DL communication from the terminal 20 via the receiving unit 120. The functional unit related to signal transmission in the controlling unit 140 may be included in the transmitting unit 110, and the functional unit related to signal reception in the controlling unit 140 may be included in the receiving unit 120.

<Terminal 20>

Figure 17:
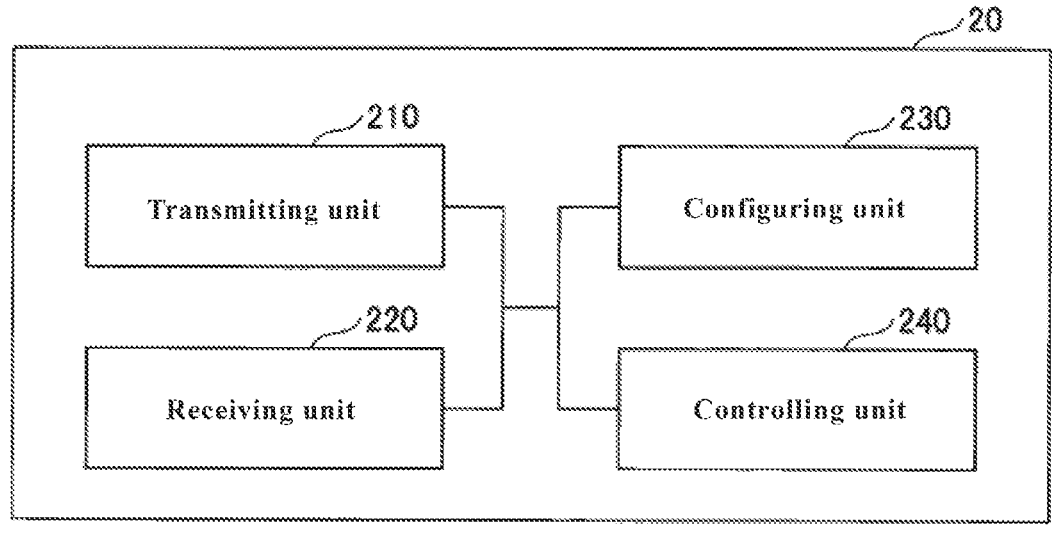
FIG. 17 A drawing illustrating an example of a functional configuration of a terminal 20 according to an embodiment of the present invention.

FIG. 17 is a drawing illustrating an example of a functional configuration of a terminal 20. As shown in FIG. 17, the terminal 20 comprises a transmitting unit 210, a receiving unit 220, a configuring unit 230, and a controlling unit 240. The functional configuration shown in FIG. 17 is only an example. Any functional classification and any functional unit name may be used as long as the operations according to the embodiments of the present invention can be performed.

The transmitting unit 210 generates a transmission signal from the transmission data and transmits the transmission signal wirelessly. The receiving unit 220 receives various signals wirelessly and acquires a signal of a higher layer from the received signal of a physical layer. In addition, the receiving unit 220 has a function for receiving NR-PSS, NR-SSS, NR-PBCH, DL/UL/SL control signals, or reference signals and the like transmitted from the base station 10. Further, for example, the transmitting unit 210, as D2D communication, transmits PSCCH (Physical Sidelink Control Channel), PSSCH (Physical Sidelink Shared Channel), PSDCH (Physical Sidelink Discovery Channel), PSBCH (Physical Sidelink Broadcast Channel) and the like to other terminals 20, and the receiving unit 220 receives PSCCH, PSSCH, PSDCH, PSBCH and the like from other terminals 20.

The configuring unit 230 stores, in the storage device, various configuration information received from the base station 10 or the terminal 20 via the receiving unit 220, and reads them from the storage device if necessary. The configuring unit 230 also stores pre-configured configuration information. The contents of the configuration information are, for example, information related to configuration of D2D communication.

The controlling unit 240 performs processing related to SL communication and HARQ for SL communication as described in the example. In addition, the controlling unit 240 transmits information related to the HARQ response of the SL communication scheduled for other terminals 20 by the base station 10 to the base station 10. Further, the controlling unit 240 may perform scheduling of SL communication for other terminals 20. The functional unit related to signal transmission in the controlling unit 240 may be included in the transmitting unit 210, and the functional unit related to signal reception in the controlling unit 240 may be included in the receiving unit 220.

(Hardware Configuration)

Block diagrams (FIG. 16 and FIG. 17) used in the description of the embodiments above show blocks of each function unit. These functional blocks (configuration units) are achieved by any combination of at least one of hardware and software. Further, the method of achieving each functional block is not particularly limited. That is, each functional block may be achieved by using one physically or logically coupled device, by directly or indirectly (for example, in a wired or wireless manner) connecting two or more physically or logically separated devices, and by using these multiple devices. The functional block may be achieved by combining software with the one device above or the plurality of devices above.

The functions include, but are not limited to, judging, deciding, determining, computing, calculating, processing, deriving, investing, searching, confirming, receiving, transmitting, outputting, accessing, resolving, choosing, selecting, establishing, comparing, assuming, expecting, treating, broadcasting, notifying, communicating, forwarding, configuring, reconfiguring, allocating, mapping, assigning, etc. For example, a functional block (configuration unit) that makes transmission function is called a transmitting unit or a transmitter. As described above, neither of these methods is specifically limited.

Figure 18:
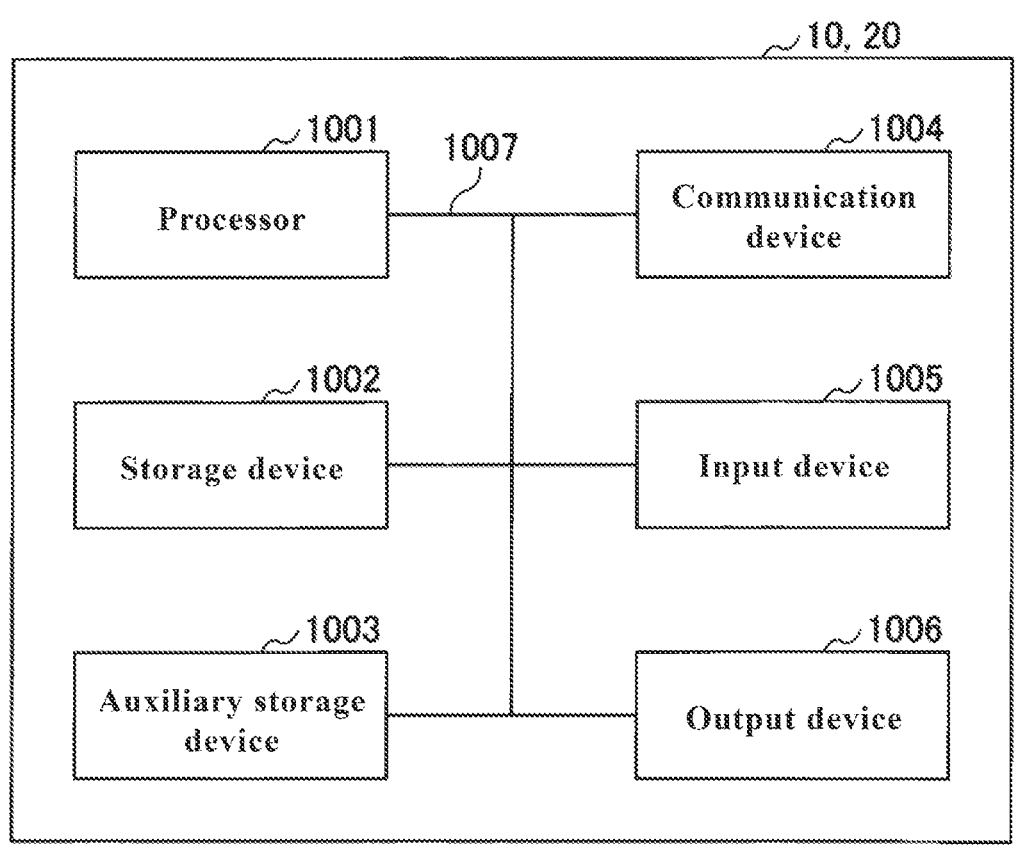
FIG. 18 A drawing illustrating an example of a hardware structure of the base station 10 or the terminal 20 according to the embodiment of the present invention.

For example, the base station 10, the terminal 20 and the like in one embodiment of the present disclosure may function as a computer that processes the wireless communication methods of the present disclosure. FIG. 18 is a drawing illustrating an example of a hardware structure of a base station 10 and a terminal 20 according to an embodiment of the present disclosure. The base station 10 and the terminal 20 above may be physically configured as a computer device including a processor 1001, a storage device 1002, an auxiliary storage device 1003, a communication device 1004, an input device 1005, an output device 1006, a bus 1007 and the like.

In the following description, term "device" can be understood as a circuit, a device, a unit and the like. A hardware configuration of the base station 10 and the terminal 20 may be configured to include one or more of the devices shown in the drawings or may be configured to not include some of the devices.

Each function in the base station 10 and the terminal 20 is achieved by the processor 1001 to perform calculation by loading a predetermined software (a program) on hardware such as the processor 1001 and the storage device 1002, by controlling communication by the communication device 1004, and by controlling at least one of reading and writing data on the storage device 1002 and the auxiliary storage device 1003.

The processor 1001, for example, operates an operating system to control the entire computer. The processor 1001 may be configured by a central processing unit (CPU) including an interface with a peripheral equipment, a control device, an arithmetic device, a register and the like. For example, the controlling unit 140, the controlling unit 240 and the like above may be achieved by the processor 1001.

Further, the processor 1001 reads a program (a program code), a software module, data and the like from at least one of the auxiliary storage device 1003 and the communication device 1004 into the storage device 1002, and performs various processes according to the program, the software module and the data. For the program, a program that causes a computer to perform at least some of the operations described in the above embodiments is used. For example, the controlling unit 140 of the base station 10 shown in FIG. 16 may be included in the storage device 1002 and achieved by a control program operated on the processor 1001. Further, for example, the controlling unit 240 of the terminal 20 shown in FIG. 17 may be included in the storage device 1002 and achieved by a control program operated on the processor 1001. Although it has been described that the various processes described above are performed by one processor 1001, these processes may be performed simultaneously or sequentially by two or more processors 1001. The processor 1001 may be implemented by one or more chips. The program may be transmitted from a network via a telecommunication line.

The storage device 1002 is a computer-readable recording medium, and may be configured by at least one of, for example, ROM (Read Only Memory), EPROM (Erasable Programmable ROM), EEPROM (Electrically Erasable Programmable ROM), and RAM (Random Access Memory). The storage device 1002 may be called a register, a cache, a main memory (a main storage device) and the like. The storage device 1002 can store a program (a program code), a software module and the like that can be operate to implement a communication method according to one embodiment of the present disclosure.

The auxiliary storage device 1003 is a computer-readable recording medium, and may be configured by at least one of, for example, an optical disk such as a CD-ROM (Compact Disc ROM), a hard disk drive, a flexible disk, an optical magnetic disk (for example, a compact disk, a digital versatile disk, Blu-ray (registered trademark) disk), a smart card, a flash memory (for example, a card, a stick, a key drive), a floppy (registered trademark) disk, and a magnetic strip. The storage medium described above may be, for example, a database, a server or other suitable mediums including at least one of the storage device 1002 and the auxiliary storage device 1003.

The communication device 1004 is hardware (a transmitting/receiving device) for communicating between computers via at least one of a wired network and a wireless network, and is also referred to as, for example, a network device, a network controller, a network card, and a communication module. The communication device 1004 may be configured to include, for example, a high frequency switch, a duplexer, a filter, and a frequency synthesizer in order to achieve at least one of frequency division duplex (FDD) and time division duplex (TDD). For example, a transmitting/receiving antenna, an amplifier unit, a transmitting/receiving unit, a transmission line interface and the like may be achieved by the communication device 1004. The transmission/receiving unit may be implemented in a physically or logically separated manner between the transmitting unit and the receiving unit.

The input device 1005 is an input device (for example, a keyboard, a mouse, a microphone, a switch, a button, and a sensor) that receives input from outside. The output device 1006 is an output device (for example, a display, a speaker and an LED lamp) that performs output to outside. The input device 1005 and the output device 1006 may have an integrated configuration (for example, a touch panel).

Further, each device such as the processor 1001 and the storage device 1002 is connected by a bus 1007 for communicating information. The bus 1007 may be configured by using a single bus, or may be configured by using a different bus for each device.

Further, the base station 10 and the terminal 20 may be configured to include hardware such as a microprocessor, a digital signal processor (DSP), an application specific integrated circuit (ASIC), a programmable logic device (PLD), a field programmable gate array (FPGA) and the like, and some or all of the functional blocks may be achieved by the hardware. For example, the processor 1001 may be implemented using at least one of these hardware.

SUMMARY OF EMBODIMENTS

As described above, according to an embodiment of the present invention, a terminal is provided; the terminal includes: a receiving unit configured to receive, from a base station, one or more pieces of information specifying a plurality of codebooks for transmitting a response related to retransmission control to be applied to transmission and reception in a downlink; a controlling unit configured to determine which codebook among the plurality of codebooks is a codebook for transmitting a response related to retransmission control to be applied to transmission and reception in a sidelink; and a transmitting unit configured to transmit to the base station, by using the determined codebook, one or more responses related to retransmission control to be applied to transmission and reception in the sidelink.

With the above configuration, the terminal 20 may determine the codebook type to be used for reporting a plurality of SL-HARQ-ACKs in a case where a plurality of HARQ-ACK codebooks are configured for DL reception. That is, a plurality of HARQ (Hybrid automatic repeat request)-ACKs may be reported to the base station in direct communication between terminals.

The information specifying the plurality of codebooks may include a first codebook and a second codebook, a priority associated with the first codebook being low, and a priority associated with the second codebook being high. With this configuration, the terminal 20 may determine the codebook type to be used for reporting a plurality of SL-HARQ-ACKs according to the priority in a case where a plurality of HARQ-ACK codebooks are configured for DL reception.

The controlling unit may select the first codebook in a case where the priority associated with the transmission and reception in the sidelink is low, and select the second codebook in a case where the priority associated with the transmission and reception in the sidelink is high. With this configuration, the terminal 20 may determine the codebook type to be used for reporting a plurality of SL-HARQ-ACKs according to the priority in a case where a plurality of HARQ-ACK codebooks are configured for DL reception.

The information specifying the plurality of codebooks may include a first codebook to be applied to a primary PUCCH (Physical uplink control channel) group and a second codebook to be applied to a secondary PUCCH group. With the above configuration, the terminal 20 may determine the codebook type to be used for reporting a plurality of SL-HARQ-ACKs in a case where a plurality of HARQ-ACK codebooks are configured for DL reception.

The controlling unit may determine the first codebook or the second codebook corresponding to the PUCCH group that transmits the one or more responses. With the above configuration, the terminal 20 may determine the codebook type to be used for reporting a plurality of SL-HARQ-ACKs based on the PUCCH group for transmitting the report, in a case where a plurality of HARQ-ACK codebooks are configured for DL reception.

Further, according to an embodiment of the present invention, a communication method is provided; the method including: receiving, from a base station, one or more pieces of information specifying a plurality of codebooks for transmitting a response related to retransmission control to be applied to transmission and reception in a downlink; determining which codebook among the plurality of codebooks is a codebook for transmitting a response related to retransmission control to be applied to transmission and reception in a sidelink; and transmitting to the base station, by using the determined codebook, the one or more responses related to retransmission control to be applied to transmission and reception in the sidelink.

With the above configuration, the terminal 20 may determine the codebook type to be used for reporting a plurality of SL-HARQ-ACKs in a case where a plurality of HARQ-ACK codebooks are configured for DL reception. That is, a plurality of HARQ (Hybrid automatic repeat request)-ACKs may be reported to the base station in direct communication between terminals.

SUPPLEMENT TO EMBODIMENTS

Although the embodiments of the present invention have been described above, the disclosed inventions are not limited to such embodiments, and those skilled in the art will understand various modifications, corrections, alternatives, substitutions and the like. Although explanations have been given using specific numerical examples in order to promote understanding of the present invention, these numerical values are merely examples and any appropriate values may be used unless otherwise specified. Classification of items in the above description is not essential to the present invention, and elements described in two or more items may be used in combination as necessary, and an element described in one item may be applied to another element (as long as there is no contradiction) described in other items. A boundary of the functional unit or the processing unit in the functional block diagram does not necessarily correspond to a boundary of the physical components. Operations of the plurality of functional units may be physically performed by one component, or operations of one functional unit may be physically performed by a plurality of components. For the processing procedure described in the embodiments, the processing order may be changed as long as there is no contradiction. For convenience of description of processing, although the base station 10 and the terminal 20 have been described with reference to functional block diagrams, such devices may be implemented in hardware, software, or a combination thereof. Software operated by a processor of the base station 10 according to the embodiment of the present invention and software operated by a processor of the terminal 20 according to the embodiment of the present invention respectively may be stored in a random access memory (RAM), a flash memory, a read-only memory (ROM), EPROM, EEPROM, a register, a hard disk (HDD), a removable disk, CD-ROM, a database, a server or any other suitable storage medium.

Further, the indication of information is not limited to the aspects/embodiments described in the present disclosure, and may be performed by using other methods. For example, the indication of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (MIB (Master Information Block)), SIB (System Information Block)), other signals or a combination thereof. Further, RRC signaling may be called an RRC message and may be, for example, an RRC connection setup message, and an RRC connection reconfiguration message.

Each aspect/embodiment described in the present disclosure may be applied at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using other suitable systems, and a next generation system expanded based on these. Further, a plurality of systems may be applied in a combination (for example, a combination of at least one of LTE and LTE-A and 5G).

The order of processing procedures, sequences, flowcharts, etc. of each aspect/embodiment described in the present specification may be changed as long as there is no contradiction. For example, the methods described in the present disclosure present elements of various steps using exemplary orders, and are not limited to the particular order presented.

The specific operation performed by the base station 10 in the present specification may be performed by its upper node in some cases. In a network consisting of one or more network nodes having the base station 10, it is obvious that various operations performed for communication with the terminal 20 are performed by the base station 10 and at least one of other network nodes (for example, MME, and S-GW, but not limited to these) other than the base station 10. In the above example, a case where there is one network node other than the base station 10 is illustrated, but other network nodes may be a combination of a plurality of the other network nodes (for example, MME and S-GW).

The information, signals, etc. described in the present disclosure may be output from an upper layer (or a lower layer) to a lower layer (or an upper layer). Input/output may be performed via a plurality of network nodes.

The input/output information and the like may be stored in a specific place (for example, a memory) or may be managed using a management table. Information to be input/output may be overwritten, updated or added. The output information and the like may be deleted. The input information and the like may be transmitted to the other device.

Determination in the present disclosure may be performed by a value represented by 1 bit (0 or 1), may be performed by a true/false value (Boolean: true or false), or may be performed by comparison of numerical values (for example, comparison with a predetermined value).

Software, whether called software, firmware, middleware, microcode, hardware description language, or other names, should be broadly interpreted to mean an instruction, an instruction set, a code, a code segment, a program code, a program, a subprogram, a software module, an application, a software application, a software package, a routine, a subroutine, an object, an executable file, an execution thread, a procedure, a feature and the like.

Further, software, an instruction, information and the like may be transmitted and received via a transmission medium. For example, if software uses at least one of wired technology (coaxial cable, optical fiber cable, twisted pair, digital subscriber line (DSL), etc.) and wireless technology (infrared, microwave, etc.) and is transmitted from a website, a server or other remote sources, at least one of these wired and wireless technologies is included within the definition of a transmission medium.

The information, signal, etc. described in the present disclosure may be represented using any of a variety of different technologies. For example, the data, the instruction, the commands, the information, the signal, the bit, the symbol, the chip, etc. may be represented by voltage, current, electromagnetic waves, magnetic field or magnetic particle, light field or photon, or any combination of these.

The terms described in the present disclosure and the terms necessary for understanding the present disclosure may be replaced with terms having the same or similar meanings. For example, at least one of the channel and the symbol may be a signal (signaling). The signal may also be a message. Further, the component carrier (CC) may be called a carrier frequency, a cell, a frequency carrier and the like.

The terms "system" and "network" used in the present disclosure are used interchangeably.

Further, the information, parameters, etc. described in the present disclosure may be represented using an absolute value, may be represented by a relative value from a predetermined value, or may be represented by other corresponding information. For example, a radio resource may be indicated by an index.

The names used for the parameters mentioned above should not be limited in any respect. Further, mathematical formulas and the like using these parameters may differ from those explicitly disclosed in the present disclosure. Since various channels (for example, PUCCH, and PDCCH) and information elements can be identified by any suitable names, various names assigned to these various channels and information elements should net be limited in any respect.

In the present disclosure, the terms "base station (BS)", "wireless base station", "base station", "fixed station", "NodeB", "eNodeB (eNB)", "gNodeB (gNB)", "access point", "transmission point", "reception point", "transmission/reception point", "cell", "sector", "cell group", "carrier", "component carrier", etc. may be used interchangeably. The base station may be called by terms such as macrocell, small cell, femtocell and picocell.

The base station can accommodate one or more (for example, three) cells. When the base station accommodates a plurality of cells, the entire base station coverage area can be divided into a plurality of smaller areas, and each of the smaller areas can provide communication service by a base station subsystem (for example, a small indoor base station (RRH: Remote Radio Head)). The term "cell" or "sector" refers to a part or the whole of at least one of the coverage area of the base station and the base station subsystem that provides communication service in this coverage.

In the present disclosure, the terms "mobile station (MS)", "user terminal", "user equipment (UE)", "terminal", etc. may be used interchangeably.

The mobile station may be called by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be called a transmission device, a reception device, a communication device and the like. At least one of the base station and the mobile station may be a device mounted on a movable body, a movable body itself and the like. The movable body may be a vehicle (for example, a car, and an airplane), may be an unmanned movable body (for example, a drone, and a self-driving car), or may be a robot (manned or unmanned). It should be noted that at least one of the base station and the mobile station includes a device that does not necessarily move during communication operation. For example, at least one of the base station and the mobile station may be IoT (Internet of Things) equipment such as a sensor.

Further, the base station in the present disclosure may be replaced by a user terminal. For example, each aspect/ embodiment of the present disclosure may be applied to a configuration replaced by communication between a plurality of terminals 20 (for example, called D2D (Device-to-Device), and V2X (Vehicle-to-Everything)) for communication between the base station and the user terminal. In this case, the terminal 20 may have the function of the base station 10 described above. In addition, terms such as "upstream" and "downstream" may be replaced by terms corresponding to communication between terminals (for example, "side"). For example, an upstream channel, a downstream channel and the like may be replaced by a side channel.

Similarly, the user terminal in the present disclosure may be replaced by a base station. In this case, the base station may have the function of the user terminal described above.

A term "determining" used in the present disclosure may include a wide variety of operations. "Determining" may include "determining", judging, calculating, computing, processing, deriving, investigating, looking up, search, inquiry (for example, searching in a table, a database or another data structure) and ascertaining. "Determining" may include "determining" receiving (for example, receiving information), transmitting (for example, transmitting information), input, output and accessing (for example, accessing data in a memory). Further, "determining" may include "determining" resolving, selecting, choosing, establishing, comparing, etc. That is, "determining" may include "determining" a certain operation. Further, "determining" may be replaced by "assuming", "expecting", "considering" and the like.

Terms "connected" and "coupled" or any variation thereof refer to any direct or indirect connection or coupling between two or more elements and may include the presence of one or more intermediate elements between the two "connected" or "coupled" elements each other. Connection or coupling between the elements may be physical, logical, or a combination thereof. For example, "connection" may be replaced by "access". As used in the present disclosure, the two elements use at least one of one or more wires, cables and printed electrical connections, and as some non-limiting and non-comprehensive examples, and are considered to be "connected" or "coupled" to each other using electromagnetic energy having wavelengths in a radio frequency domain, a microwave domain and a light (both visible and invisible) domain.

The reference signal may be abbreviated as RS and may be called a pilot according to the applied standard.

"Based on" as used in the present disclosure does not mean "based only on" unless otherwise stated. In other words, the phrase "based on" means both "based only on" and "based at least on".

Any reference to the elements using designations such as "first", "second" and so on as used in the present disclosure does not generally limit the quantity or order of those elements. These designations may be used in the present disclosure as a convenient method to distinguish between two or more elements. Therefore, references to the first and second elements do not mean that only two elements can be adopted, or that the first element must somehow precede the second element.

The "means" in the configuration of each of the above devices may be replaced by a "part", a "circuit", a "device" and the like.

When "include", "including" and variations thereof are used in the present disclosure, these terms are intended to be inclusive as a term "comprising". Further, the term "or" used in the present disclosure is intended not to be exclusive.

A radio frame may be configured by one or more frames in a time domain. Each frame of the one or more frames in the time domain may be called a subframe. The subframe may further be configured by one or more slots in the time domain. The subframe may be a fixed time length (for example, 1 ms) that does not depend on numerology.

The numerology may be a communication parameter that applies to at least one of transmission and reception of a signal or a channel. The numerology may indicate at least one of, for example, a subcarrier spacing (SCS), a bandwidth, a symbol length, a cyclic prefix length, a transmission time interval (TTI), a number of symbols per TTI, a wireless frame configuration, a specific windowing process performed by a transmitter/receiver to perform in a frequency domain, and a specific window wink process for the transmitter/receiver to perform in a time domain.

The slot may be configured by one or more symbols (OFDM (Orthogonal Frequency Division Multiplexing) symbol, and SC-FDMA (Single Carrier Frequency Division Multiple Access) symbol, etc.) in the time domain. The slot may be in time units based on numerology.

The slot may include a plurality of mini slots. Each mini slot may be configured by one or more symbols in the time domain. Further, the mini slot may be called a sub slot. The mini slot may be configured by a smaller number of symbols than the slots. PDSCH (or PUSCH) transmitted in the time unit larger than the mini slot may be called PDSCH (or PUSCH) mapping type A. PDSCH (or PUSCH) transmitted using the mini slot may be called PDSCH (or PUSCH) mapping type B.

The radio frame, the subframe, the slot, the mini slot and the symbol all represent in the time unit for transmitting a signal. For the radio frame, the subframe, the slot, the mini slot and the symbol, correspondingly different names may be used.

For example, one subframe may be called a transmission time interval (TTI), a plurality of consecutive subframes may be called TTI, and one slot or one mini slot may be called TTI. That is, at least one of the subframe and TTI may be a subframe (1 ms) in existing LTE, may be a period shorter than 1 ms (for example, 1-13 symbols), or may be a period longer than 1 ms. The unit representing TTI may be called a slot, a mini slot and the like instead of the subframe.

Here, TTI refers to, for example, the minimum time unit of scheduling in wireless communication. For example, in the LTE system, the base station schedules each terminal 20 to allocate a wireless resource (a frequency bandwidth that can be used in each terminal 20, transmission power, etc.) in a TTI unit. The definition of TTI is not limited to this.

TTI may be a transmission time unit such as a channel-encoded data packet (transport block), a code block, a code word and the like, and may be a processing unit such as scheduling, link adaptation and the like. When TTI is given, the time interval (for example, a number of symbols) to which the transport block, the code block, the code word, etc. is actually mapped may be shorter than the corresponding TTI.

When one slot or one mini slot is called TTI, one or more TTI (that is, one or more slots or one or more mini slots) may be the minimum time unit for scheduling. Further, a number of slots (a number of mini slots) configuring the minimum time unit of the corresponding scheduling may be controlled.

TTI having a time length of 1 ms may be called a usual TTI (TTI in LTE, Rel. 8-12), a normal TTI, a long TTI, a usual subframe, a normal subframe, a long subframe, a slot and the like. A TTI shorter than the normal TTI may be called a shortened TTI, a short TTI, a partial TTI (a partial or fractional TTI), a shortened subframe, a short subframe, a mini slot, a subslot, a slot and the like.

The long TTI (for example, a usual TTI and a subframe) may be replaced by a TTI having a time length of more than 1 ms, and the short TTI (for example, a shortened TTI) may be replaced by a TTI having a TTI length less than the TTI length of the long TTI and of 1 ms or more.

The resource block (RB) is a resource allocation unit in the time domain and the frequency domain and may include one or more continuous subcarriers in the frequency domain. A number of subcarriers included in RB may be the same regardless of numerology, for example, it may be 12. A number of subcarriers included in RB may be determined based on numerology.

The time domain of RB may also include one or more symbols and may be a length of one slot, one mini slot, one subframe, or one TTI. Each of one TTI, one subframe, etc. may be configured by one or more resource blocks.

One or more RBs may be called a physical resource block (PRB: Physical RB), a sub-carrier group (SCG), a resource element group (REG), a PRB pair, an RB pair and the like.

Further, the resource block may be configured by one or more resource elements (REs). For example, one RE may be a wireless resource domain of one subcarrier and one symbol.

A bandwidth part (BWP) (which may also be called a partial bandwidth) may represent a subset of consecutive common RB (common resource blocks) for a certain neurology in a certain carrier. Here, the common RB may be specified by an index of RB with respect to a common reference point of the carrier. PRB may be defined in a certain BWP and may be numbered within the corresponding BWP.

The BWPs may include a BWP for UL (UL BWP) and a BWP for DL (DL BWP). One or more BWPs may be set in one carrier for the terminal 20.

At least one of the set BWPs may be active and the terminal 20 may not be assumed to transmit/receive a predetermined signals/channel outside the active BWP. Further, the "cell", "carrier", etc. in the present disclosure may be replaced by "BWP".

The configurations of the radio frame, the subframe, the slot, the mini slot, the symbol and the like described above are merely examples. For example, configurations such as a number of subframes included in the radio frame, a number of slots per subframe or radio frame, a number of mini slots included in the slot, a number of symbols and RBs included in the slot or the mini slot, a number of subcarriers included in RB, a number of symbols in TTI, the symbol length, the cyclic prefix (CP) length can be changed in various ways.

In the present disclosure, if an article is added by translation, for example, a, an and the in English, the present disclosure may include plural nouns following these articles.

In the present disclosure, a term "A and B are different" may mean "A and B are different from each other". The term may also mean "A and B are different from C". Terms such as "separate", "combine" and the like may be interpreted in the same way as "be different".

Each aspect/embodiment described in the present disclosure may be independently used, may be used in combination, or may be used by switching according to performance. Further, an indication of predetermined information (for example, an indication of "being X") is not limited to an explicit one, and may be performed implicitly (for example, the notification of the predetermined information is not performed).

Note that, in the present disclosure, HARQ-ACK is an example of a response related to the retransmission control.

Although the present disclosure has been described in detail above, it is clear to those skilled in the art that the present disclosure is not limited to the embodiments described in the present disclosure. The present disclosure may be implemented as amendment and modification aspects without departing from the spirit and scope of the present disclosure, which are determined by the description of the scope of claims. Therefore, description of the present disclosure is for purposes of illustration and does not have any limiting meaning to the present disclosure.

EXPLANATION OF REFERENCE NUMERALS

10 Base station
110 Transmitting unit
120 Receiving unit
130 Configuring unit
140 Controlling unit
20 Terminal
210 Transmitting unit
220 Receiving unit
230 Configuring unit
240 Controlling unit
1001 Processor
1002 Storage device
1003 Auxiliary storage device
1004 Communication device
1005 Input device
1006 Output device

The invention claimed is:

1. A terminal comprising:
a receiving unit configured to receive, from a base station, first information that is related to one codebook for transmitting a response that is related to retransmission control applied to transmission and reception in downlink and second information that is related to one or more codebooks for transmitting a response that is related to retransmission control applied to transmission and reception in downlink; and
a transmitting unit configured to transmit, to the base station, a response that is related to retransmission control applied to transmission and reception in sidelink by using a type of codebook that is determined based on the first information in a case where the second information is configured.

2. The terminal as claimed in claim 1, wherein
the second information related to one or more codebooks
is information related to up to two codebooks.

3. The terminal as claimed in claim 1, wherein
the transmitting unit transmits, to the base station, a
response that is related to retransmission control
applied to transmission and reception in down-
link by using a type of codebook that is determined based on
the second information in a case where the second
information is configured.

4. A terminal comprising:
a receiving unit configured to receive, from a base station,
first information that is related to one codebook for
transmitting a response that is related to retransmission
control applied to transmission and reception in down-
link and third information, which is different from
second information being related to multiple code-
books for transmitting a response that is related to
retransmission control applied to transmission and
reception in downlink, that is related to retransmission
control applied to transmission and reception in down-
link and is related to a codebook for transmitting a
response for a secondary PUCCH (Physical Uplink
Control Channel) group; and
a transmitting unit configured to transmit, to the base
station, a response related to retransmission control
applied to transmission and reception in sidelink by
using a type of codebook that is determined based on
the first information in a case where the third informa-
tion is configured.

5. The terminal as claimed in claim 4, wherein
the transmitting unit transmits, to the base station, a
response for the secondary PUCCH group related to
retransmission control applied to transmission and
reception in downlink by using a type of codebook that
is determined based on the third information in a case
where the third information is configured, and trans-
mits, to the base station, a response for a primary
PUCCH group related to retransmission control applied
to transmission and reception in downlink by using a
type of codebook that is determined based on the first
information.

6. A base station comprising:
a transmitting unit configured to transmit, to a terminal,
first information that is related to one codebook for
transmitting a response that is related to retransmission
control applied to transmission and reception in down-
link and second information that is related to one or
more codebooks for transmitting a response that is
related to retransmission control applied to transmis-
sion and reception in downlink; and

a receiving unit configured to receive, from the terminal,
a response that is related to retransmission control
applied to transmission and reception in sidelink by
using a type of codebook that is determined based on
the first information in a case where the second infor-
mation is configured.

7. A communication system comprising: a terminal; and a
base station, wherein
the terminal includes:
a receiving unit configured to receive, from the base
station, first information that is related to one code-
book for transmitting a response that is related to
retransmission control applied to transmission and
reception in downlink and second information that is
related to one or more codebooks for transmitting a
response that is related to retransmission control
applied to transmission and reception in downlink;
and
a transmitting unit configured to transmit, to the base
station, a response that is related to retransmission
control applied to transmission and reception in
sidelink by using a type of codebook that is deter-
mined based on the first information in a case where
the second information is configured, and
the base station includes:
a transmitting unit configured to transmit the first
information and the second information to the ter-
minal; and
a receiving unit configured to receive, from the termi-
nal, a response that is related to retransmission
control applied to transmission and reception in
sidelink by using a type of codebook that is deter-
mined based on the first information in a case where
the second information is configured.

8. A communication method performed by a terminal, the
communication method comprising:
receiving, from a base station, first information that is
related to one codebook for transmitting a response that
is related to retransmission control applied to transmis-
sion and reception in downlink and second information
that is related to one or more codebooks for transmit-
ting a response that is related to retransmission control
applied to transmission and reception in downlink; and
transmitting, to the base station, a response that is related
to retransmission control applied to transmission and
reception in sidelink by using a type of codebook that
is determined based on the first information in a case
where the second information is configured.

* * * * *